US012651085B2

(12) United States Patent
Boemer et al.

(10) Patent No.: US 12,651,085 B2
(45) Date of Patent: Jun. 9, 2026

(54) PRIVACY-PRESERVING RECOMMENDATION GENERATION

(71) Applicant: Apple Inc., Cupertino, CA (US)

(72) Inventors: Fabian K. Boemer, Mountain View, CA (US); Venkat Kranthi Chalasani, Dublin, CA (US); Andrii Cherkashyn, Cupertino, CA (US); Matthew L. Jockers, Bainbridge Island, WA (US); Muqun Li, Jersey City, NJ (US); Sudhanshu Mohan, Woodbridge, NJ (US); Rahul Nim, Palo Alto, CA (US); Yuantao Peng, New York City, NY (US); Rehan Rishi, San Francisco, CA (US); Hazi Malang Riyaaz Shaik, Sunnyvale, CA (US); Karl Tarbe, Cupertino, CA (US); Pranav Prashant Thombre, San Jose, CA (US); Haluk N. Tokgozoglu, New York City, NY (US); Chandrasekar Venkataraman, Los Altos, CA (US); Wei Xu, Clyde Hill, WA (US)

(73) Assignee: Apple Inc., Cupertino, CA (US)

( * ) Notice: Subject to any disclaimer, the term of this patent is extended or adjusted under 35 U.S.C. 154(b) by 44 days.

(21) Appl. No.: 18/437,866

(22) Filed: Feb. 9, 2024

(65) Prior Publication Data

US 2024/0403476 A1 Dec. 5, 2024

Related U.S. Application Data

(60) Provisional application No. 63/505,749, filed on Jun. 2, 2023.

(51) Int. Cl.
| | |
|---|---|
| *G06F 21/62* | (2013.01) |
| *G06F 16/9535* | (2019.01) |
| *G06F 21/60* | (2013.01) |

(52) U.S. Cl.
CPC ...... *G06F 21/6227* (2013.01); *G06F 16/9535* (2019.01); *G06F 21/602* (2013.01)

(58) Field of Classification Search
None
See application file for complete search history.

(56) References Cited

U.S. PATENT DOCUMENTS

| | | | |
|---|---|---|---|
| 10,810,235 B1 | 10/2020 | Bakshi | |
| 12,380,484 B1 * | 8/2025 | Chaturvedi | ........ G06Q 30/0631 |

(Continued)

FOREIGN PATENT DOCUMENTS

| | | | | |
|---|---|---|---|---|
| CN | 106202331 B | * | 8/2019 | ......... G06F 16/9535 |
| WO | WO-2015191921 A1 | * | 12/2015 | ......... G06Q 30/0282 |

OTHER PUBLICATIONS

Badsha et al. Privacy Preserving User-Based Recommender System. 2017 IEEE 37th International Conference on Distributed Computing Systems. Jun. 5-8, 2017. 1074-1083. (Year: 2017).*

(Continued)

*Primary Examiner* — Jeffrey R Swearingen
(74) *Attorney, Agent, or Firm* — Kowert, Hood, Munyon, Rankin & Goetzel, P.C.; Paul T. Seegers; Dean M. Munyon

(57) ABSTRACT

A computing device provides a user recommendation according to one or more privacy protocols. The computing device sends to a server one or more encrypted recommendation requests for recommendation information relating to a set of items, where the recommendation requests are encrypted by a cryptographic key not accessible to the server. The server uses the encrypted recommendation requests and a recommendation data store to generate one or more encrypted recommendation responses that it returns to the computing device using at least one of the privacy protocols, which prevents the server from accessing the encrypted recommendation request and recommendation (Continued)

response. The computing device receives from the server the encrypted recommendation responses relating to the set of items and decrypts the recommendation responses. Then, the computing device generates a user recommendation relating to the set of items from the decrypted recommendation responses and provides the recommendation to the user.

17 Claims, 14 Drawing Sheets

(56)                    References Cited

U.S. PATENT DOCUMENTS

| | | | |
|---|---|---|---|
| 2014/0187266 A1 | 7/2014 | Nawaz et al. | |
| 2016/0012238 A1* | 1/2016 | Ioannidis | H04N 21/25891 |
| | | | 713/189 |
| 2020/0065512 A1 | 2/2020 | Chou et al. | |
| 2022/0114456 A1* | 4/2022 | Nouri | G06F 9/4881 |
| 2022/0392219 A1 | 12/2022 | Chatzidakis et al. | |
| 2023/0206283 A1* | 6/2023 | Maher | G06Q 30/0273 |
| | | | 705/14.69 |
| 2024/0259623 A1* | 8/2024 | Harb | H04N 21/4532 |

OTHER PUBLICATIONS

Location-Based Services: Definition and Examples, Business News Daily, retrieved Jan. 25, 2024, pp. 1-15, https://www.businessnewsdaily.com/5386-location-based-services.html.
Notes on Geohashing, retrieved Jan. 25, 2024, pp. 1-8, https://eugene-eeo.github.io/blog/geohashing.html.
Benny Chor, et al., Private Information Retrieval, Journal of the ACM, vol. 45, No. 6, Nov. 1998, pp. 965-982.
Verma et al., "Artificial Intelligence based Recommendation System," 2020 2nd International Conference on Advances in Computing, Communication Control and Networking (ICACCCN), pp. 669-673.

* cited by examiner

*Single-stage encrypted
KV operation
700A*

*Single-stage distance
computation
700B*

Two-Stage
operation
700C

3-Stage lookup
700D

*3-Stage lookup*
*700E*

800A

800B

PRIVACY-PRESERVING RECOMMENDATION GENERATION

PRIORITY CLAIM

This application claims priority to U.S. Provisional Application No. 63/505,749 entitled "Privacy-Preserving Recommendation Generation" filed on Jun. 2, 2023, which is incorporated by reference herein in its entirety.

BACKGROUND

Technical Field

This disclosure relates generally to providing recommendations to users, and more specifically, providing recommendations from a server while preserving privacy.

Description of the Related Art

Recommendations are a ubiquitous part of the modern online experience. Such recommendations are provided to users of many types of digital platforms, such as websites, applications, online marketplaces, and social networks. For example, an online bookstore may provide suggestions to users on what books to purchase. Recommendations aim to enhance user experience and encourage continued user engagement by providing detailed suggestions that align with the user's interests or needs, saving time and effort in discovering relevant content. It is thus in the interest of the digital platform to provide recommendations that reflect user preferences as accurately as possible.

Some platforms generate recommendations to their users based on user account information already stored by the platform's servers. For example, an online shopping website may recommend a list of items that are similar to the items the user has previously viewed or purchased (this information being accessible to the website's servers). As another example, the shopping website may use other users' purchase information alongside the user's own purchase information to generate lists of items that are frequently bought together.

DETAILED DESCRIPTION

Figure 1:
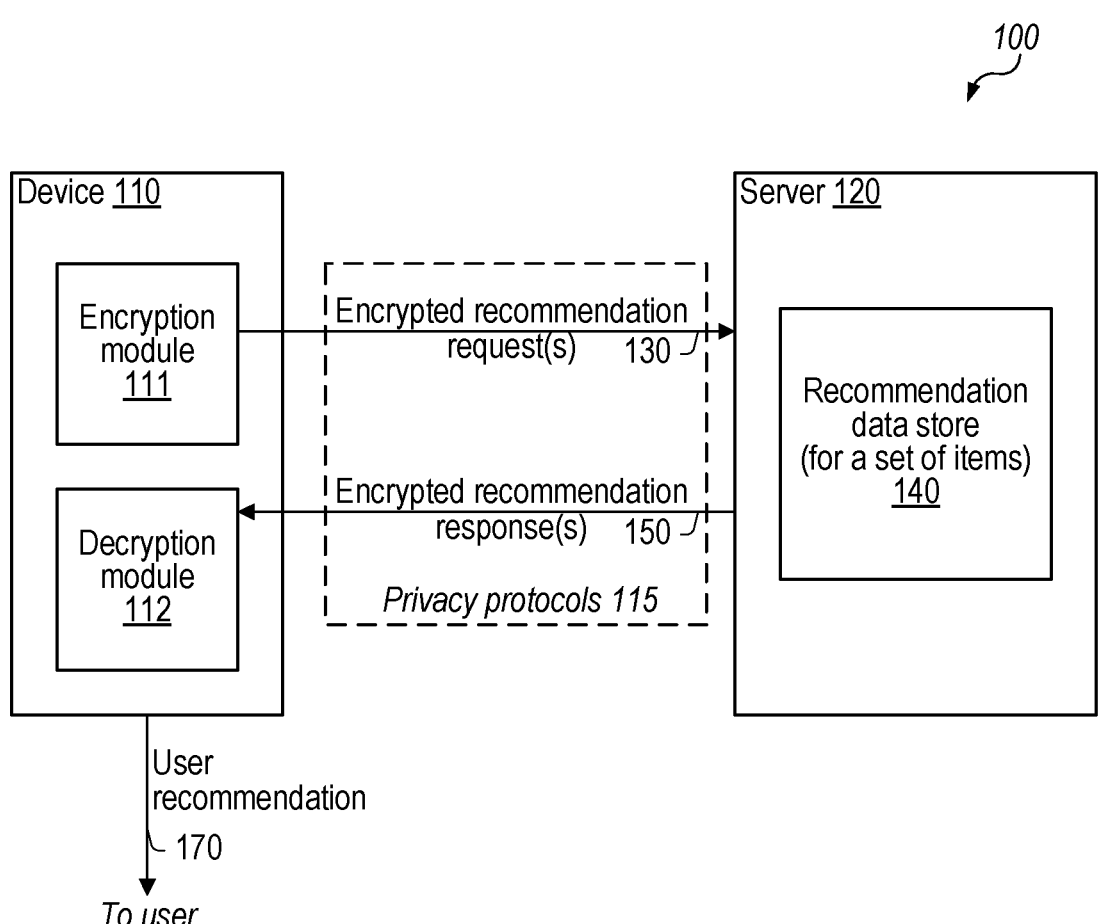
FIG. 1 is a block diagram of a system for generating and providing user recommendations.

Content recommendation is commonly generated by a platform's servers, which may store a large catalog of available items (e.g., millions of books). Server-side data such as purchase and browsing histories can in many cases provide accurate insights into a given user's purchase preferences. But such information (particularly in the case of digital content) may not necessarily reflect how (or the extent to which) the user has interacted with these purchases. As such, it may be desirable for a platform to use additional information that reflects user engagement. With respect to a book-selling platform, for example, information relating to a user's completion percentage of a particular book (or other information such as the amount of time reading the book, the number of highlights, or the number of times the book has been read) may thus be more helpful in identifying the user's interest in purchasing a similar book than the mere fact of the book's purchase. This type of information may be used to supplement purchase history and distinguish, for example, between books a user has merely purchased but not read and books the user has purchased and books with which the user has heavily engaged. The book platform in this example can thus be able to provide superior recommendations using this combination of information.

In the case of digital media, engagement information (percentage of completion, etc.) is commonly collected on client-side devices (e.g., smartphones, e-book readers) where such content is actually consumed. In other words, while the server may record the purchase of the content, the media content app on the client device will typically record the engagement information in the first instance. To be sure, such engagement information may be communicated from the client to the server devices in order to facilitate high-quality recommendations. But in an era where user privacy takes on increased importance, some platforms and users may wish to prioritize user privacy by not disseminating users' sensitive data such as detailed media consumption information.

One possible method to prevent sensitive user information from leaving a client device is to download the server-side information (e.g., the complete catalog of available items), and then have the client device generate recommendations without server involvement. But such information may be extremely voluminous, and thus it may not be feasible for typical client devices such as smartphones to generate recommendations on such a scale. Such a regime may overly tax the memory or processing power of such devices, for example. While it may instead be possible to download a smaller catalog, the resulting recommendations would not benefit from the same quantity of server-side information and may thus be of lower quality. The inventors have recognized the need for generating high-quality recommendations that utilize the full extent of server-side information while preserving the privacy of users' sensitive information.

The inventors have realized that this conflict can be addressed using privacy protocols. As used herein, a "privacy protocol" or "privacy retrieval protocol" is any algorithm that permits retrieval of information from a server in a manner that seeks to limit the likelihood that the server can learn the identity of the requested data. Privacy protocols include protocols based on privacy-preserving computation techniques such as homomorphic encryption, Secure Multi-Party Computation (MPC), functional encryption, differential privacy, federated learning, oblivious RAM, and the like. One example class of privacy protocols is Private Information Retrieval (PIR) protocols. PIR protocols allow for key-value retrievals from a data store using encrypted parameters, but without the data store learning the values of those parameters (thus providing privacy). Other privacy protocols may enable additional types of computations (e.g., numeric computations) to be performed on a server using the server's own data, without the server learning the values of data included in requests to that server. APPLE's proprietary Private Encrypted Compute (PEC) is one example of another privacy protocol. The present disclosure explicitly contemplates operations that combine multiple types of privacy protocols as well as individual privacy protocols with more than a single type of privacy-preserving technique. For example, a given privacy protocol may utilize both functional encryption and homomorphic encryption.

This disclosure refers to privacy protocols that enable generating recommendations for users by sending encrypted user information that a server cannot read in plaintext form. For example, some PIR protocols enable generating recommendations by implementing key-value (KV) retrieval (or lookup), and other privacy protocols enable generating recommendations by implementing embedding-based operations. The users can thus receive precise individualized recommendations without unnecessarily divulging sensitive information to another computer system. Note that in some privacy protocols, both KV and embedding-based operations are used. Furthermore, in some embodiments, privacy protocols can use multiple techniques (for example, both homomorphic and non-homomorphic computation techniques).

This paradigm is illustrated in FIG. 1, which depicts a block diagram of an example system 100 for generating and providing user recommendations 170. As shown, system 100 includes a device 110 that communicates with a server 120 according to privacy protocols 115. As will be described, device 110 sends an encrypted recommendation request 130 to server 120 and receives an encrypted recommendation response 150 in return, which it decrypts to provide a user recommendation 170.

Computing device 110 is any device configured to use privacy protocols 115 to send, using encryption module 111, an encrypted recommendation request 130 relating to a set of items (e.g., digital content, tangible goods). Device 110 then receives and decrypts an encrypted recommendation response 150 and uses the resulting decrypted data to generate user recommendation 170. In many cases, device 110 may be a phone, a tablet, a personal computer, e-book reader, or any type of similar user-facing device. In some cases, device 110 may have specific hardware (e.g., a Secure Enclave Processor (SEP)) that assists in encryption and decryption operations. An example embodiment of device 110 will be discussed in more detail with respect to FIG. 2. In some cases, device 110 is any computer system that has private user data that is desired to be kept separate from another computer system such as server 120.

Server 120 is a computing device configured to receive encrypted recommendation request 130 from device 110 and sends a subsequent encrypted recommendation response 150 back to device 110 using data from a recommendation data store 140. Server 120 may, in some embodiments, use encrypted recommendation request 130 on recommendation data store 140 to generate encrypted recommendation response 150. Server 120 may be any type of computing device and may be comprised of one or multiple distributed computing devices. Server 120 may be any type of computer system that stores or has access to one or more types of digital content. As such, server 120 may be a media server, an app store, an online shopping website, or any other type of system that may benefit from sending recommendations to users. An example embodiment of server 120 will be discussed in more detail with respect to FIG. 3.

Recommendation data store 140 includes data relating to the set of items that the recommendation request 130 pertains to. While the information in recommendation data store 140 is visible to server 120, the use of privacy protocols 115 allows server 120 to communicate with device 110 without knowing the content requested by device 110. Encrypted recommendation requests 130 may be homomorphically encrypted, which allows server 120 to perform homomorphic operations such as addition, multiplication, or comparison on recommendation data store 140 using encrypted requests 130 without needing to decrypt or otherwise know the contents of requests 130. These arithmetic operations may subsequently be leveraged by server 120 to advantageously conduct various privacy-preserving operations, as will be discussed in more detail with respect to FIGS. 4-5.

Encrypted recommendation requests 130 are sent by device 110 to server 120. As will be discussed below, requests 130 may correspond to multiple different types of operations (e.g., key-value (KV) request, distance query) and may include one or more encrypted items (e.g., an encrypted identifier for a particular digital item, such as a book's ISBN number). Encryption recommendation request 130 may be encrypted by device 110 using homomorphic key encryption with a symmetric or asymmetric key (e.g., private key of a key pair) of device 110. In some embodiments, device 110 may send multiple encrypted requests 130 in multiple rounds of each privacy protocol depending on, for example, the personalization level of the recommendation that the server desires to provide. Accordingly, single-stage and multi-stage operations are discussed herein. Note that, although not pictured in FIG. 1, additional unencrypted data may accompany encrypted recommendation request 130. For example, an unencrypted request type flag might be sent to server 120 that describes the specific type of operation (e.g., KV request, distance query) being performed. Encrypted recommendation request 130 may, in some embodiments, be sent to server 120 as an Application Programming Interface (API) function call.

As shown, encrypted recommendation responses 150 are sent by server 120 in response to encrypted recommendation request 130. Server 120 may use a privacy-preserving technique to output encrypted recommendation response 150 based on request 130. As such, encrypted recommendation responses 150 cannot be decrypted or otherwise read in plaintext by server 120. If recommendation request 130 is homomorphically encrypted, then encrypted recommendation response 150 is ciphertext that can be decrypted only using recommendation request 130's decryption key (e.g., symmetric key or private key of a key pair). Furthermore, responses 150 may be of various formats depending on the type of request 130. For example, encrypted recommendation response 150 may contain metadata related to the set of items of encrypted recommendation request 130 (e.g., a genre tag of a book). Alternatively, recommendation response 150 may contain a list of multiple recommended items. Multiple recommendation responses 150 may also be output by server 120 depending on the number of encrypted recommendation requests 130. Various examples illustrating the different types of information that may be included in respective requests 130 and responses 150 are discussed herein.

User recommendation 170 is provided to the user based decrypted recommendation response data generated by decryption module 112. For example, device 110 might receive and rank a decrypted list of items depending on their similarity to other items the user has used and display that ranking as user recommendation 170. User recommendation 170 may be of different formats. For example, user recommendation 170 may be a notification sent to the user based on user preferences. User recommendation 170 may be provided to the user in response to user input (e.g., a user explicitly asking for a recommendation via a search engine). But user recommendation 170 may also be provided automatically without a user prompt.

To reiterate, users of device 110 can, according to privacy protocols 115, advantageously receive precise individualized recommendations 170 without unnecessarily divulging sensitive information to server 120. Using this paradigm, user recommendations 170 may be of higher quality than if they were generated only using information available at the server (i.e., excluding information available at device 110). In this manner, system 100 can provide a better user experience without compromising user privacy.

Figure 2:
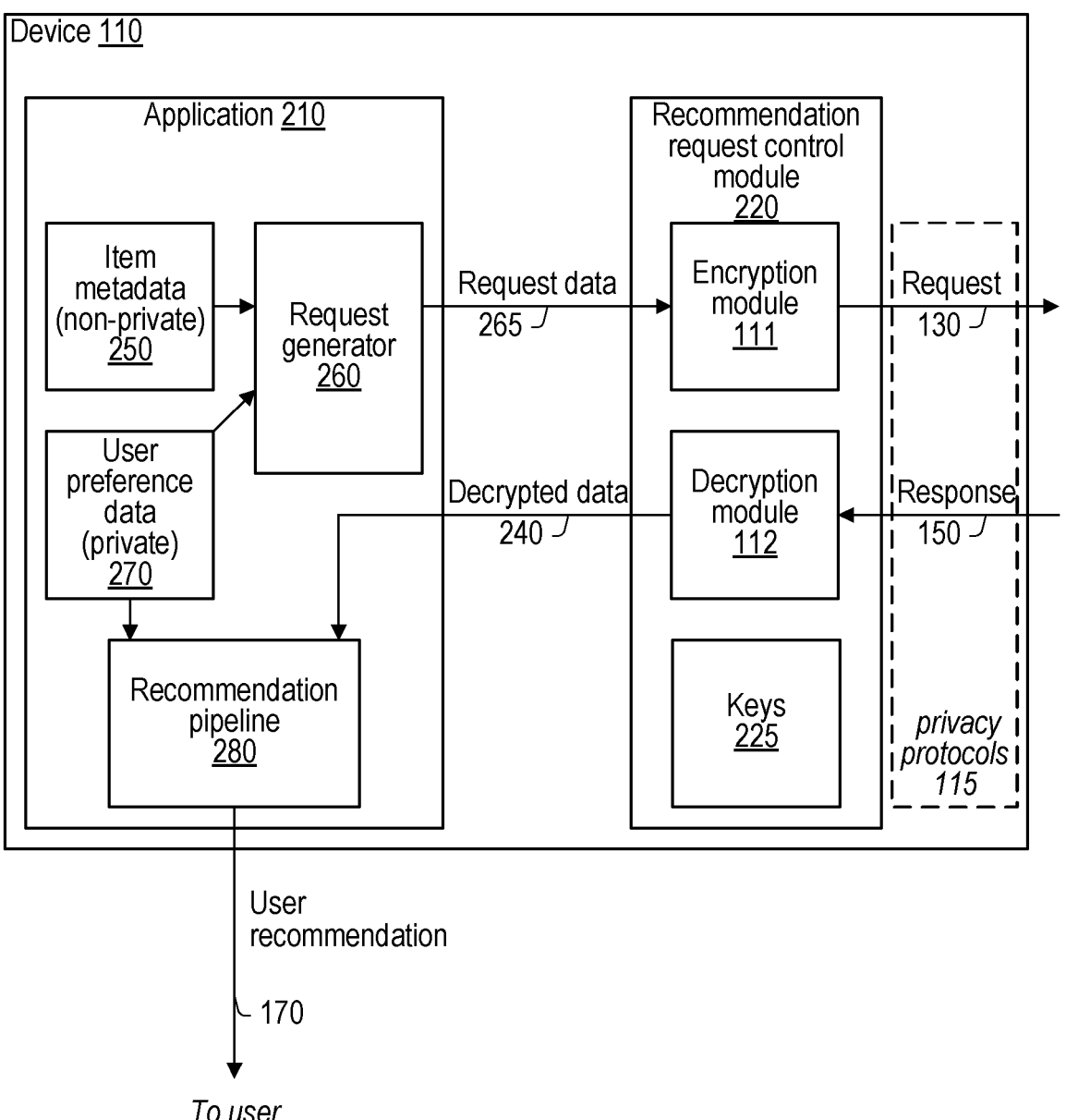
FIG. 2 is a block diagram of one embodiment of a computing device that is configured to communicate with a server according to one or more privacy protocols.

FIG. 2 is a block diagram of one embodiment of computing device 110 that is configured to communicate with server 120 according to privacy protocols 115. As shown, device 110 includes an application 210 and a recommendation request control module 220. Device 110 sends an encrypted recommendation request 130 to server 120. Once device 110 receives recommendation response 150 in response to request 130, response 150 is decrypted and used to generate a user recommendation 170.

Device 110 is configured to execute application 210 and use recommendation request control module 220 when sending recommendation request 130 and receiving recommendation response 150. In some cases, device 110 is a user-facing device such as a smartphone, a PC, a tablet, or an e-book reader, etc. In other embodiments, device 110 could be a server computer system (separate from server 120) that has access to data of a user that is not to be shared with server 120.

Application 210 is any application that provides user recommendations 170 to its users with respect to a set of items (e.g., books, music, video, social media content, tangible goods). Note that a "set of items," as that phrase is used herein, can be heterogeneous-thus a set of items may include books and music and movies, etc. For example, application 210 may be a media content app (e.g., APPLE MUSIC) and provide recommendations of media that the media content app can be used to consume. As part of its operation, application 210 stores data in (non-private) item metadata 250 and (private) user preference data 270, both of which can be used to generate user recommendation 170. In other embodiments, metadata 250 and data 270 may be stored externally to application 210 within device 110.

Item metadata 250 includes information identifying and describing items of application 210. For example, item metadata 250 may be book ISBNs, author names, genre tags, prices, etc. Item metadata 250 may be stored in one or more data structures, one or more files, one or more database, or any combination thereof. In some embodiments, item metadata 250 is obtained from third-party servers. In some cases, metadata 250 may be added by the user of application 210. In many cases, item metadata 250 is generic and thus describes items of application 210 at a high level (and thus does not reveal user preferences when sent to third-party servers). For example, item metadata 250 may store each book's ISBN, which cannot be used by third party servers such as server 120 to infer whether the user has actually read the books the ISBNs refer to.

On the other hand, user preference data 270, as that term is used herein, is collected based on the activity on computing device 110 relative to the set of items described by item metadata 250. For example, in the case of an e-reader application 210, user preference data 270 might include user preference information for each book that is locally stored in application 210 such as the user's book completion percentage, the amount of time reading the book, the number of highlights, or the number of times the book has been read. User preference data 270 may vary according to the categories of items being described. For example, user preference data 270 may store the user's rating of a good purchased on a shopping app, or the number of the music streaming app playlists of a user in which a particular song is found.

While both item metadata 250 and user preference data 270 could be sent to third-party server 120 to generate user recommendation 170, as discussed, the user may not desire to share user preference data 270 (which may be more private) with server 120. As discussed above, this privacy concern can be addressed by encrypting all user information before sending a recommendation request to server 120. Thus, metadata 250 and data 270 may be sent to request generator 260 to generate request data 265, which is then encrypted in recommendation request control module 220 and included as part of request 130. In some embodiments, sending data to request generator 260 is initiated by the user. Alternatively, application 210 may automatically send that data to request generator 260 (and cause request 130 to be sent) without the user explicitly requesting a user recommendation. In either case, encryption of this request is managed by recommendation request control module 220.

Recommendation request control module 220 includes modules that perform cryptographic operations needed to interface with server 120. More specifically, encryption module 111 encrypts request data 265, while decryption module 112 decrypts response 150. These operations are performed using keys 225. Notably, keys 225 are not shared with server 120, which prevents the values of request data 265 from being accessed by server 120. Keys 225 may be one or more public keys or one or more public-private key pairs depending on the type of cryptographic operations that module 220 implements (e.g., RSA). In some embodiments, recommendation request control module 220 stores multiple keys 225 corresponding to multiple applications 210, and recommendation request control module 220 accordingly manages encryption and decryption using each application's respective keys 225. Recommendation request control module 220 may, in some embodiments, be a trusted circuit such as a secure enclave processor (SEP) configured to store keys 225 in hardware and implement encryption module 111 and decryption module 112 as sub-circuits. Alternatively, recommendation request control module 220 may be implemented in software using device 110's operating system, with cryptographic keys being stored in a hardware module. Note that keys 225 may support various types of encryption, including symmetric and asymmetric.

As shown, device 110 is configured to receive an encrypted recommendation response 150 as a result of request 130. In response to receipt of recommendation response 150, recommendation request control module 220 is configured to decrypt response 150 into decrypted data 240 using decryption module 112 and keys 225. Decrypted data 240 includes one or more types of information usable by application 210 to provide user recommendation 170. For example, decrypted recommendation data 240 may contain one or more identifiers, tags, ISBNs, etc.

Recommendation pipeline 280 is executable to receive decrypted data 240 and output user recommendation 170. Recommendation pipeline 280 may also use user preference data 270 to further improve recommendation without having to share that data with other code external to device 110. For example, user preference data 270 may be used by pipeline 280 to rank different elements included within decrypted data 240 by assigning higher ranks to items that have a higher completion percentage according to user preference data 270. Additionally, recommendation pipeline 280 may communicate with other third-party servers in plaintext using item metadata 250 and/or decrypted data 240. For example, recommendation pipeline 280 may send plaintext ISBNs to a third-party server to download author information, book samples, etc. This type of plaintext exchange does not involve user preference data 270, which as noted is kept local to device 110.

Note that recommendation request module 220 may support interfacing with server 120 on behalf of other applications executing on device 110 (that is, in addition to application 210). Thus, multiple applications executing on device 110 may communicate with module 220 via an API. Accordingly, module 220 might support making recommendations for different types of applications, such as a book application, a music application, a video application, etc. Each of these applications might maintain individual user preference data usable for generating their respective recommendations.

Figure 3:
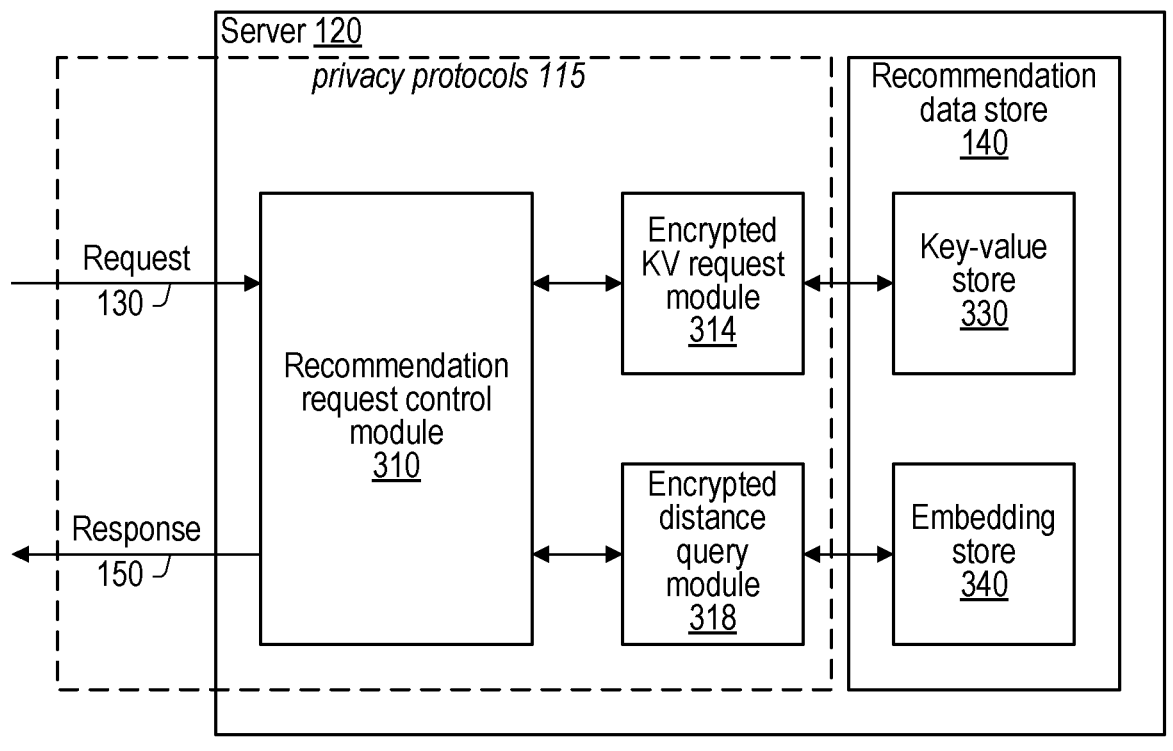
FIG. 3 is a block diagram of one embodiment of a server that is configured to communicate with devices according to one or more privacy protocols.

FIG. 3 is a block diagram of one embodiment of a server computer system 120 that is configured to communicate with device 110 according to protocols 115. As shown, server 120 includes a recommendation request control module 310, recommendation data store 140, a key-value (KV) request module 314, and a distance query request module 318. When server 120 receives a request 130 with information indicating the request type, it starts the encrypted request operation of that type. Once the request returns an output, server 120 returns a corresponding response 150 to device 110.

Server 120 is configured to interface (e.g., via an API) with requesting computing devices (e.g., device 110) via recommendation request control module 310. More specifically, recommendation request control module 310 is executable to receive request 130 and select the appropriate request (e.g., KV or distance request) to perform. The selection of the appropriate request might be based, for example, on additional information (e.g., a request type value accompanying request 130). Once the selected encrypted request is completed, recommendation request control module 310 returns the output of the request to device 110 as encrypted recommendation response 150.

Recommendation data store 140 is configured to store data that can be used to generate user recommendations. As shown, data store 140 can include different types of data repositories. Specifically depicted in FIG. 3 are KV store 330 and embedding store 340, but in other embodiments, data store 140 may also include additional types of repositories to accommodate additional request types. The data of recommendation data store 140 may be generated by server 120 or alternatively, downloaded from a different source. In other embodiments, recommendation data store 140 is altogether hosted on one or more third-party servers.

KV store 330 is configured to store one or more key-value databases that are usable by an encrypted KV request module 314 to service KV recommendation requests 130. Different types of keys and values may be stored in KV store 330. For example, KV store 330 may store a table with book ISBNs as keys and corresponding genre tags (e.g., horror, classics) as values. As another example, KV store 330 may store a key value table that includes book ISBNs as keys, but instead includes corresponding precomputed book embeddings as values. Accordingly, the values in store 330 may be any suitable type of data. In some cases, data in KV store 330 may be leveraged in multi-step recommendation requests, as will be described in more detail with respect to FIGS. 7C-D.

Encrypted KV request module 314 is executable to perform an encrypted key value operation. More specifically, module 314 uses at least part of request 130 as a key input and selects the corresponding value from key-value store 330 using homomorphic arithmetic operations. Then, module 314 outputs an encrypted value corresponding to the key's value as part of a recommendation response 150 whose unencrypted version server 120 cannot access. KV request module 314 may receive any type of input as key and return any type of output as a value corresponding to key input. An example implementation of an encrypted KV request 314 will be described in more detail with respect to FIG. 4.

While KV requests may provide helpful information in some cases, they may, in many cases, be limited to a set of predefined inputs. For example, the book ISBN KV store previously described returns information only if given exact ISBN book inputs. On the other hand, operations performed on embeddings can be performed without needing predefined inputs. This greater input space is made possible because embeddings are representations of items in a vector space (also referred to as an "embedding space") and can thus be used in many different types of arithmetic operations. Furthermore, embeddings numerically capture properties of the items they represent, which means that operations can assist in making inferences regarding item features based on their outputs. As will be discussed, these features can be seen in an operation that finds distances between an input embedding and other embeddings in the embedding space. Examples of embedding operations in the context of user recommendations are provided below.

Embedding store 340 is configured to store item embeddings used by one or more encrypted embedding operations (e.g., distance queries in an encrypted distance query module 318). Item embeddings may be output by an embedding algorithm that uses item-related inputs (e.g., text, item metadata, user preference data). For example, book embeddings may be generated using a text embedding function (e.g., Word2vec, fastText, BERT) that extracts various features of the book (e.g., tone, genre, reading levels) using the book's data (e.g., some or all paragraphs of the book) and/or metadata (e.g., title, genre tags, author). Then, those embeddings may be stored embedding store 340 (and/or any other store of recommendation data store 140). Alternatively, embeddings of embedding store 340 may be downloaded from a third-party server that hosts pre-computed embeddings.

Encrypted distance query module 318 is executable to perform distance operations on an encrypted input embedding and return one or more items that are nearest to the encrypted input, as similar items are assumed to have respective embeddings that are relatively close to each other in the embedding space. Different types of embedding inputs may be used to generate recommendations. For example, a book embedding may be used to return a list of similar books. The distance query will be described in more detail with respect to FIG. 5. In other embodiments, module 318 can perform operations other than distance.

While the example embodiment of FIG. 3 depicts two possible encrypted request types (KV request and distance query), other request types may be implemented. These requests may also be handled using homomorphic encryption, which enables the execution of many types of homomorphic operations (e.g., addition, multiplication, vector operations). For example, server 120 may implement an encrypted one-hot vector request type with each one-hot item encoding indicating which tags a particular item possesses. Then, server 120 may execute, using an encrypted request, homomorphic matrix operations (e.g., homomorphic element-wise matrix addition and/or multiplication) on data store 140's one-hot encodings to find items that share tags (in view of their encodings) with the input item vector.

Figure 4:
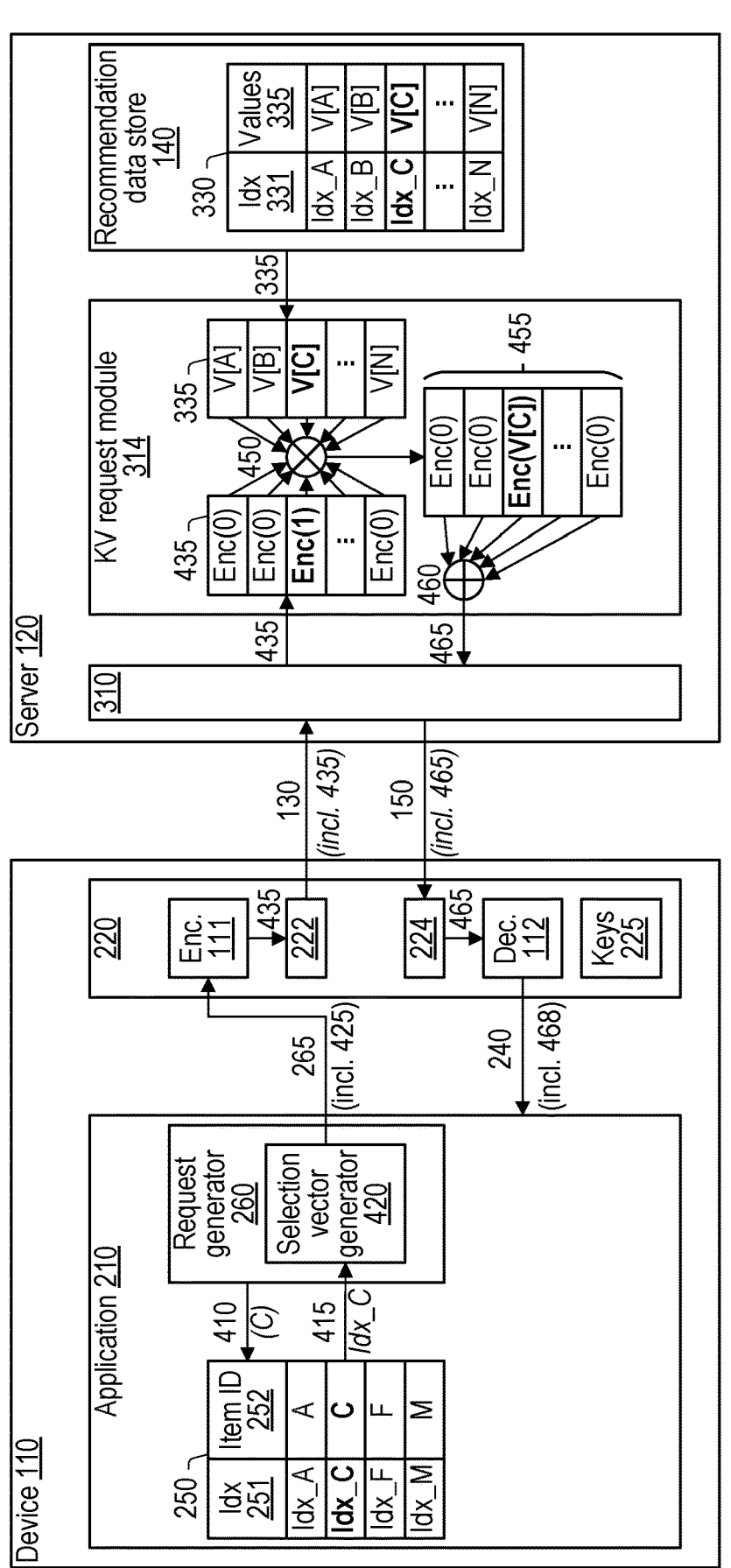
FIG. 4 is a block diagram of one embodiment of a key-value recommendation request.
Figure 5:
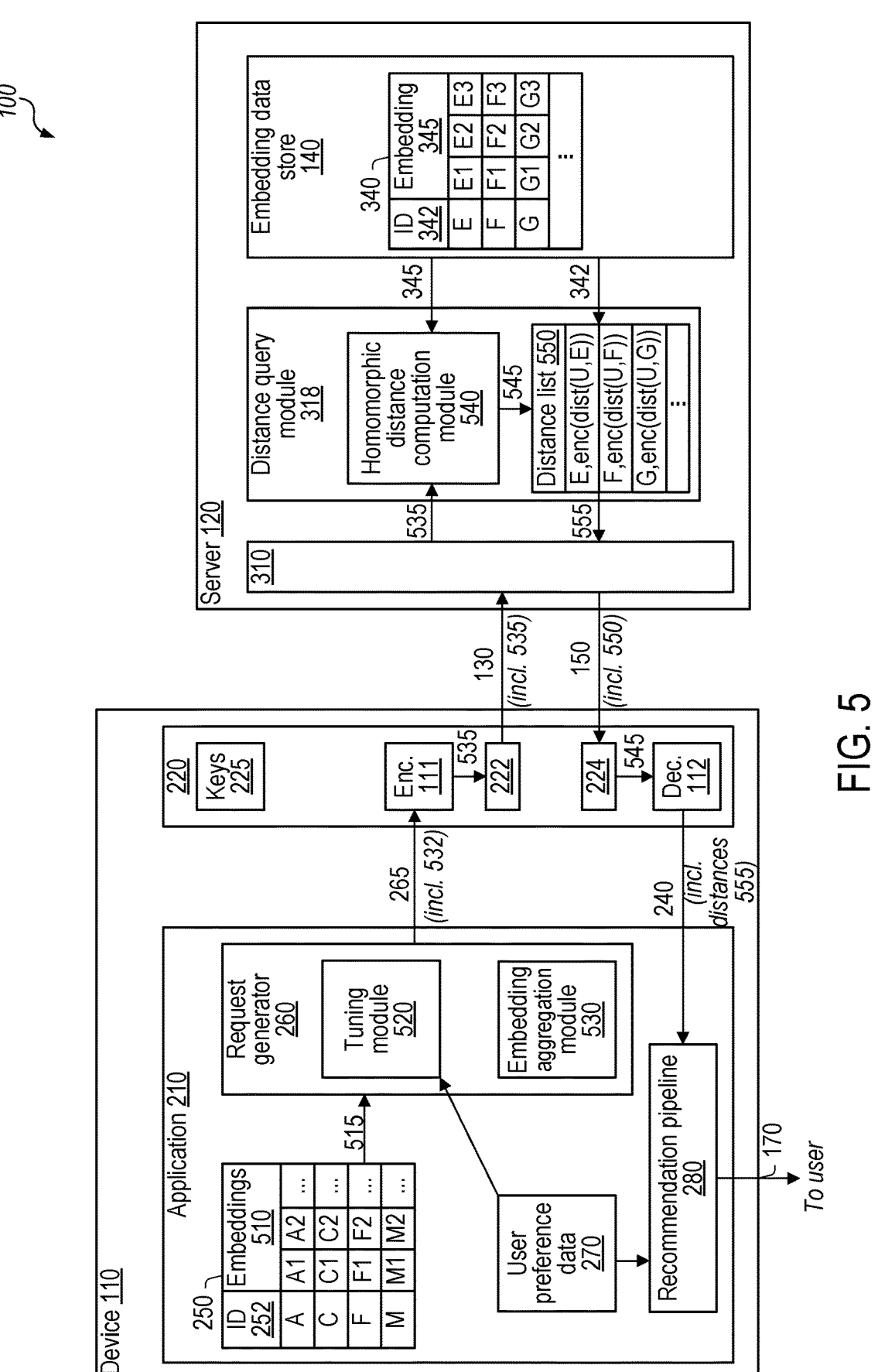
FIG. 5 is a block diagram of one embodiment of a distance query between a device and a server.

Having generally described server 120's inclusion of KV store 330 and embedding store 340, more detailed examples of the use of these two repositories in the context of generating privacy-preserving recommendations is now provided with respect to FIGS. 4-5.

FIG. 4 is a block diagram of one embodiment of a key-value PIR exchange between device 110 and server 120. Broadly speaking, FIG. 4 depicts application 210 sending a recommendation request 130 to server 120. Associated information (not pictured) indicates that request 130 is for a KV lookup, and control module 310 within server 120 accordingly routes request 130 to KV request module 314. Module 314 then interacts with data in KV data store 330 to retrieve encrypted information, which is returned to device 110 as recommendation response 150. As one example, request 130 might specify an ISBN for a book, and response 150 might include an embedding value for that book.

As has been noted, in some cases a request 130 can be initiated based on item metadata 250 stored within or accessible to application 210. In the embodiment shown, item metadata 250 is stored in a table, in which each row includes an index 251 and a particular item ID 252 that has a value relating to the corresponding item (e.g., title). In this particular example, item metadata 250 includes information relating to those items that are stored locally in device 110 (e.g., books currently stored on device 110). In other embodiments, item metadata 250 may contain more columns than shown. Thus, an additional column in item metadata 250 might include author names; accordingly, different accesses to item metadata 250 might select values from different columns as needed.

An index 251 within item metadata 250 is the key used to select a value from KV store 330. Accordingly, each entry of item metadata 250 has a corresponding entry in KV store 330. Typically, KV store 330 has many more entries than the number of entries in item metadata 250. For example, KV store 330 may include millions of entries, (e.g., for all the books in the Library of Congress, etc.), while item metadata 250 might include entries for just those books purchased by the user or those stored on device 110. As shown in FIG. 4, KV data store 330 may include entries for items A-N, while item metadata 250 may store entries for just items A, C, F, and M.

Application 210 begins the recommendation request for a particular item via request generator 260, which issues a selection request 410 for a particular item (C). In response, item metadata 250 returns the corresponding index for item C (Idx_C) as index 415, which is shown in bold in FIG. 4. Request generator then inputs Idx_C into selection vector generator 420, which outputs a selection vector 425 having a number of bits equal to the number of entries in KV store 330. Selection vector 425 is generated such that bit values are 0 at the bit positions corresponding to the non-selected elements of item metadata 250 (i.e., the bit positions corresponding to Idx_A, Idx_B, and Idx_D-Idx_N), and such that the bit value at selected index 415 (Idx_C) is 1. Selection vector 425 is sent as part of request data 265 to be homomorphically encrypted by encryption module 111. The resulting encryption of selection vector 425 (indicated by reference numeral 435) is then included in encrypted recommendation request 130 by request routing module 222. Although not depicted in FIG. 4, module 222 may also communicate additional information in conjunction with request 130, such a request type that indicates that request is directed to KV store 330.

Server 120 receives request 130, along with any accompanying information such as the request type. Recommendation request control module 310 then routes encrypted selection vector 435 to KV request module 314. Note that module 314 cannot read the plaintext equivalent to encrypted selection vector 435.

KV request module 314 is executable, in one embodiment, to perform a homomorphic element-wise multiplication 450 on encrypted selection vector 435 and plaintext values 335 from KV data store 330 to output a product vector 455. (Note that there is a correspondence between indexes 251 in item metadata 250 and indexes 331 in KV data store 330. Thus, setting the bit position in encrypted selection vector 435 corresponding to Idx_C indicates that the corresponding entry in KV data store 330 is selected—namely, V[C].) In some embodiments, multiplication 450 is performed according to the following equations (where S is an element within the set of plaintext values of vector 435):

$$Dec(Enc(0) * S) = 0; \text{ and} \qquad \text{(equation 1);}$$

$$Dec(Enc(1) * S) = S. \qquad \text{(equation 2)}$$

Equation 1 indicates that homomorphic multiplication of a value 335 (S) by Enc(0) (an encrypted version of zero) results in a product that is decryptable by device 110 as zero, while equation 2 indicates that homomorphic multiplication of a value 335 (S) by Enc(1) (an encrypted version of one) results in a version of S decryptable by device 110. Element-wise multiplication 450 thus produces a number of results in a product vector 455 that is equal to the number of entries in KV store 330, where one of the results is an encrypted version of an element in 330 and the other results are all encrypted versions of zero.

KV request module 314 is further executable to perform a homomorphic sum operation 460 that computes the sum of the elements of product vector 455. Similar to element-wise multiplication 450, addition operation 460 is homomorphic and is thus performed with the following property:

$$Dec(Enc(S) + n * Enc(0)) = S. \qquad \text{(equation 3)}$$

Accordingly, encrypted sum 465, the output of homomorphic sum operation 460, is decryptable by device 110 to output the selected key's corresponding value (here, Enc(V [C])). This is because only one element of vector 455 is an encrypted version of a non-zero value.

Encrypted sum 465 is then sent to control module 310, wherein it is included in response 150 and is received by response routing module 224 for routing to decryption module 112, which may produce a decrypted sum 468, as shown in equation 3. Then, decrypted sum 468 is included as part of decrypted data 240 and corresponds to the appropriate value of the selected item (i.e., selected input C will receive a response V [C]). Although not depicted, decrypted data 240 may be sent to recommendation pipeline 280 in some embodiments to generate user recommendation 170.

KV request module 314 may execute operations differently than shown. For example, in some embodiments, device 110 may upload as part of request 130 a ciphertext that is smaller in size than encrypted selection vector 435 shown in FIG. 4. This ciphertext can then be expanded by server 120 into an encrypted vector equivalent to encrypted selection vector 435 and used in homomorphic multiplication operation 450. Accordingly, the version of sum 465 (and thus decrypted sum 468) computed using such a ciphertext is identical to that computed using encrypted vector 435.

FIG. 4 thus describes a process by which device 110 can retrieve a particular item of encrypted data from server 120 without the server having access to the identity of the requested item. Another type of request, described next, relates to a distance computation in an embedding space. This type of inquiry is useful in the context of recommendations because it helps find items similar to a given item using their relative proximity in the embedding space. For example, a book embedding in a genre embedding space may capture the various features that books may have (register, tone, reading level, etc.) as elements of a vector in the genre embedding space. A book embedding search may thus consist of inputting a book embedding and outputting other books whose inputs are close to the input embedding in the genre embedding space.

FIG. 5 illustrates a block diagram of one embodiment of a distance query between a device 110 and a server 120. Broadly speaking, FIG. 5 depicts application 210 sending a recommendation request 130 that specifies an encrypted embedding to server 120. Associated information (not pictured) indicates that request 130 is for a distance query, and control module 310 within server 120 accordingly routes request 130 to distance query module 318. Module 318 then interacts with data in embedding data store 340 to retrieve the distances between the embeddings of embedding store 340 and the queried embedding included in request 130. Those distances are then returned to device 110 as part of recommendation response 150. As one example, request 130 might specify an embedding for a specific book, and response 150 might include a set of other embeddings and their respective distances from the embedding included in request 130.

As shown, application 210 is executable to store item metadata 250 in the form of a table in which each row includes an item ID 252 and a corresponding embedding 510. As noted, each embedding 510 is a one or more-dimensional vector representation of some value within an embedding space. In some embodiments, each element of an item embedding in the embedding space indicates the presence, absence, or degree of certain features/attributes of an item. Embeddings 510 may have different numbers of dimensions depending on the embedding function and the particular use case. Embeddings 510 may be generated by an embedding function on device 110 or be downloaded from server 120. In some embodiments, embeddings 510 may be retrieved based on previously performed key-value operations.

Application 210 begins the recommendation request process by selecting a particular set of one or more input embeddings 515 from item metadata 250. These selections may correspond to items the user has interacted with (e.g., books residing on device 110 or books browsed on device 110). These embeddings are then conveyed to request generator 260, which generates request data 265 that includes a user preference embedding 532.

In various embodiments, request generator 260 can generate output embeddings in several ways. For example, request generator 260 can simply pass through a single input embedding as user preference embedding 532. Alternatively, request generator 260 can manipulate received inputs from server 120 in some way, such as by using tuning module 520 to tune one or more input embeddings 515 based on user preference data 270. As used herein, "tuning" of an embedding refers to modifying the embedding in some way, such as by weighting the embedding. Still further, if input embeddings 515 includes two or more input embeddings (e.g., corresponding to two or more books), an embedding aggregation module 530 may be executable to aggregate (e.g., by finding the mean) the two or more input embeddings (which may themselves be tuned or not) into a single user preference embedding 532. In some embodiments, request 130 may be set up to include multiple output embeddings. Each scenario might be used in different use cases. Accordingly, tuning and aggregating arc two possible forms of manipulating or modifying intermediate inputs in the recommendation generation process.

Tuning module 520, in one embodiment, is a module that is executable to tune input embeddings 515 according to user preference data 270 and then output tuned embeddings. As has been described, user preference data 270 includes information indicative of a degree of a user's engagement with an item (e.g., percentage of media item consumed, etc.). Tuning module 520 is thus executable to tune or weight individual components of input embeddings 515. For example, tuning module 520 may receive a set of multiple input embeddings 515 and then use book ratings from user preference data 270 and to weight input embeddings 515. In that scenario, embeddings 515 that correspond to highly rated items can be more heavily considered in the generation of user preference embedding 532 than less heavily weighted embeddings.

Embedding aggregation module 530 is executable to aggregate multiple input embeddings, which may or may not be tuned by tuning module 520. In this manner, user preference embedding 532 will be more closely aligned with items that user preference data 270 indicates the user has interacted with or has expressed a greater preference. The result is that user preference embedding is indicative of the "typical" item in which the user is interested. Recommendation request control module 220 then encrypts user preference embedding 532 into an encrypted user preference embedding 535, which is included by routing module 222 as part of request 130. Note that encrypted user preference embedding 535 is not necessarily an encrypted version of the user preference embedding 532. In some cases, encrypted user preference embedding 535 may be a value that includes embedding 532 as an operand (e.g., a square root of 532, etc.), as is discussed below.

Server 120 receives request 130 including encrypted user preference embedding 535, and module 310 routes encrypted user preference embedding 535 to a homomorphic distance computation module 540. Note that distance query module 318 has access to plaintext embeddings 345 from embedding store 340. The homomorphic distance computation performed by computation module 540 may be implemented as a cosine distance computation. Equation 4 below describes a plaintext cosine distance computation, while equation 5 describes an example homomorphic distance computation performed by module 540:

$$dist(U, E) = \frac{U \cdot E}{\|U\|\|E\|} = \frac{\sum_{i=1}^{n}(U_i \cdot E_i)}{\sqrt{\sum_{i=1}^{n}U_i^2} \cdot \sqrt{\sum_{i=1}^{n}E_i^2}}; \text{ and} \quad \text{(equation 4)}$$

$$Dec(dist(Enc(U), E)) = \quad \text{(equation 5)}$$
$$\frac{\sum_{i=1}^{n}(Enc(U_i) \cdot E_i)}{\sqrt{\sum_{i=1}^{n}Enc(U_i^2)} \cdot \sqrt{\sum_{i=1}^{n}E_i^2}} = dist(U, E).$$

In equation 5, U is an n-dimensional homomorphically encrypted user preference embedding, E is an n-dimensional unencrypted embedding whose distance to U is being measured, $U_i$ and $E_i$ are the $i^{th}$ components of embeddings U and E, respectively, and Enc( ) is an encryption function performed by device 110. Notably, equation 5 indicates that the output of the distance computation with the encrypted input U and plaintext input E can be decrypted (e.g., by device 110) into a plaintext version of the distance between embeddings U and E.

In some embodiments, homomorphic distance computation module 540 may iterate through a group of embeddings 345 of embedding store 340 and homomorphically compute distances between each embedding of embeddings 345 and user preference embedding 532 More specifically, module 540 may perform the following steps: 1) receive encrypted user preference embedding 535 (Enc(U)), 2) homomorphically compute, for each embedding of embeddings 345

$$\sum_{i=1}^{n}(Enc(U_i) \cdot E_i), \sqrt{\sum_{i=1}^{n}Enc(U_i^2)}, \text{ and } \sqrt{\sum_{i=1}^{n}E_i^2},$$

and 3) homomorphically multiply/divide elements from step 2 according to equation 5. Then, each output ciphertext distance 545 is stored as an entry of distance list 550 and is decryptable by device 110 to describe the distance between user preference embedding 532 and the respective input embedding from embeddings 345. In other embodiments, homomorphic distance computation module 540 may perform other homomorphic distance operations (e.g., Euclidean distance operation).

Device 110 and server 120 may communicate and perform operations differently than discussed above. For example, device 110 may, instead of sending Enc(U), compute and send $$Enc\left(\frac{U}{\sqrt{\sum_{i=1}^{n}U_i^2}}\right)$$

as part of encrypted request 130. This paradigm avoids having to execute computationally expensive homomorphic division and square root operations $$\left(e.g., \sum_{i=1}^{n}(Enc(U_i) \cdot E_i), \sqrt{\sum_{i=1}^{n}Enc(U_i^2)}\right)$$

on server 120. Note that depending on the homomorphic encryption scheme being used, each ciphertext relating to embeddings U and E may encrypt a vector of values, rather than a single scalar. So $Enc(E_i)$ is not necessarily a distinct ciphertext from $Enc(E_{i+1})$.

As shown, computation module 540 is executable to generate a distance list 550 in which each entry corresponds to a particular entry in the embedding space and indicates a distance within the embedding space between the particular entry's embedding and embedding 535 (represented by the letter U). In some embodiments, each row of distance list 550 includes an unencrypted ID 342 and an encrypted distance 545 corresponding to one or more items in embedding store 340. While IDs 342 are unencrypted, distance list 550 contains encrypted distances 545, thus preventing server 120 from using distances to infer which specific item(s) in store 340 are relevant (e.g., similar) to request 130.

Distance list 550 is provided to control module 310, which includes it within response 150. Response routing module 224 within recommendation request control module 220 then routes distance list 550 to decryption module 112, which decrypts encrypted distances to decrypted distances 555. Routing module 224 may additionally route plaintext IDs to recommendation pipeline 280 to assist in generating recommendations 170. Distance list 550 may contain more elements than shown, such as plaintext embeddings 345 from embedding data store 340.

Decrypted data 240 (including decrypted distances 555) and corresponding item IDs 342 may then be sent to recommendation pipeline 280 to generate one or more user recommendations 170. Recommendation pipeline 280 may, for example, further rank items according to their respective embedding distance from user preference embedding 532, as well as on other factors specified by user preference data 270. Furthermore, recommendation pipeline 280 may generate recommendations 170 according to several criteria such as distances being above or below a certain threshold value. In some cases, recommendation pipeline 280 may also be responsible for culling recommended items to a specified threshold number of recommendations.

The example of FIG. 5 may, more generally, be said to help facilitate a nearest neighbor search (NNS) operation whose steps are split between device 110 and server 120: server 120 performs distance computation 540, while device 110 ranks plaintext distances 555 to find items whose embeddings are close to user preference embedding 532. But in other embodiments, server 120 may be configured to perform both steps of the NNS operation. More specifically, server 120 may perform a homomorphic distance computation 540, perform homomorphic comparison operations on encrypted distances 545, rank respective items by encrypted distance 545, and output an encrypted distance list 550 whose entries are ranked by server 120, without the server knowing the plaintext of those distances. Alternatively, server 120 may return an unranked subset of items of a smaller size whose distances are the closest to the user preference embedding, thereby reducing both the size of response 150 and the number of computations that device 110 has to perform.

As noted, both KV request module 314 and distance query module 318 may operate on all or a large enough number of elements of respective stores 330 and 340 to guarantee that server 120 cannot infer the plaintext that is the subject of request. But such homomorphic arithmetic operations on entire data stores may undesirably increase the computation time at server 120 and/or the size of response 150 (e.g., encrypted distance list 550). Thus, the inventors have realized that sharding repositories within data store 140 can alleviate that issue while preserving user privacy, as discussed next.

Figure 6A:
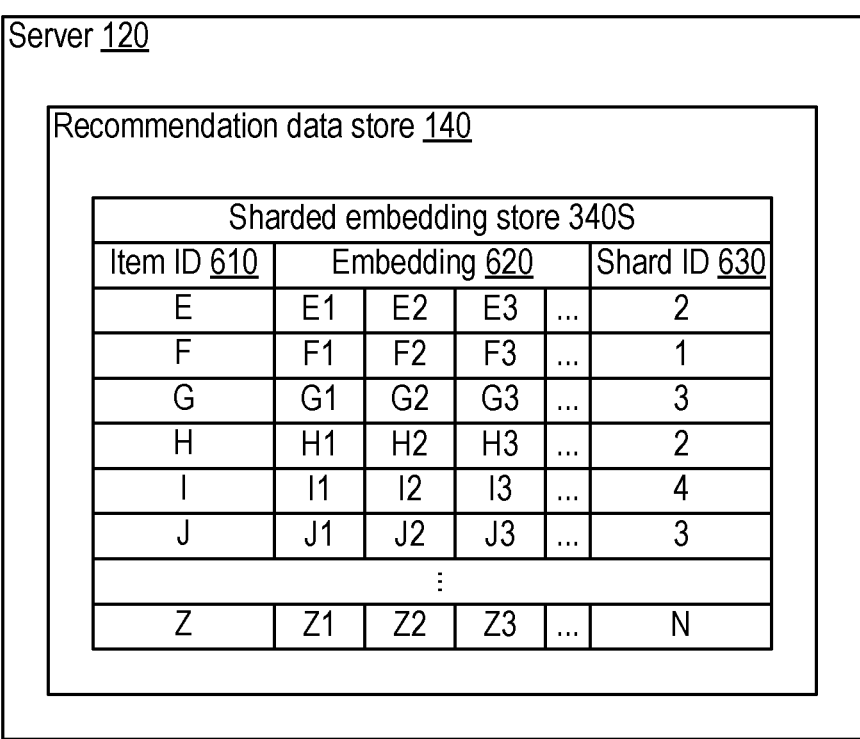
FIG. 6A. is a block diagram of one embodiment of a sharded embedding store.

Turning now to FIG. 6A, a block diagram depicts an embodiment of an embedding store 340S within server 120 that has been sharded. As used herein, the term "shard" refers to a partition of a larger data repository, such as KV store 330 or embedding store 340. Sharding—the process of creating such partitions—thus creates more manageably sized portions, which in this case can lead to performing privacy protocols such as PIR on smaller-sized sets of data. In one embodiment, sharded embedding store 340S (which is divided into shards 1-N, where N is at least 2) includes respective item IDs 610 and embeddings 620 in a manner similar to its unsharded counterpart embedding store 340. But additionally, each entry in embedding store 340S is associated with a shard ID 630.

When a repository within recommendation data store 140 is sharded (e.g., store 340S), this allows a module such as homomorphic distance computation module 540 to run homomorphic operations (e.g., homomorphic addition, homomorphic distance computations) on fewer than the total number of shards in the store. In order to accomplish this, server 120 needs to know the shard IDs on which it is to operate. Accordingly, device 110's communication with server 120 may include sending multiple selected shard IDs in plaintext as part of additional information sent to server 120. Upon receiving the selected shard IDs, server 120 performs the requested queries only on the shards with selected shard IDs. This use of sharding reduces the size of both the operation and the response 150 sent to device 110. Furthermore, using multiple shards (as opposed to identifying only a single shard) prevents server 120 from identifying which shard is actually being requested and guarantees differential privacy.

Sharding may be used on data stores of any item type. For example, in KV requests, selected shards, including the requested key's shard, may be sent in plaintext form to an embodiment of server 120 that includes a sharded KV store 330S (not shown). In such an implementation, KV operations of KV request module 314 are performed on the selected shards. Since one of the selected shards of sharded KV store 330 is known to contain the requested key, the KV operation is guaranteed to return the key's corresponding value, despite having performed the KV operation on multiple, superfluous shards of store 330S to help foster privacy.

Server 120 may be sharded according to any suitable type of sharding policy. For example, server 120 may assign shards to items in a round-robin fashion. Alternatively, shards may be assigned randomly. Still further, server 120 may assign shards based on a hash of item IDs 610 into various buckets, with each bucket corresponding to a different shard ID. Server 120 may also be configured to qualitatively assign shards to items depending on item properties. In some embodiments, server 120 may assign shards to items according to genre or other item property. As sharded embedding store 340S includes embeddings, server 120 may determine different regions in the embedding space of embeddings 620 and assign each item a shard ID according to the embedding cluster its embedding is in, as will be shown in more detail with respect to FIG. 7E. These qualitative sharding policies lend themselves to homomorphic distance computations, as they increase the chances that each requested item will have similar items in its respective shard.

Figure 6B:
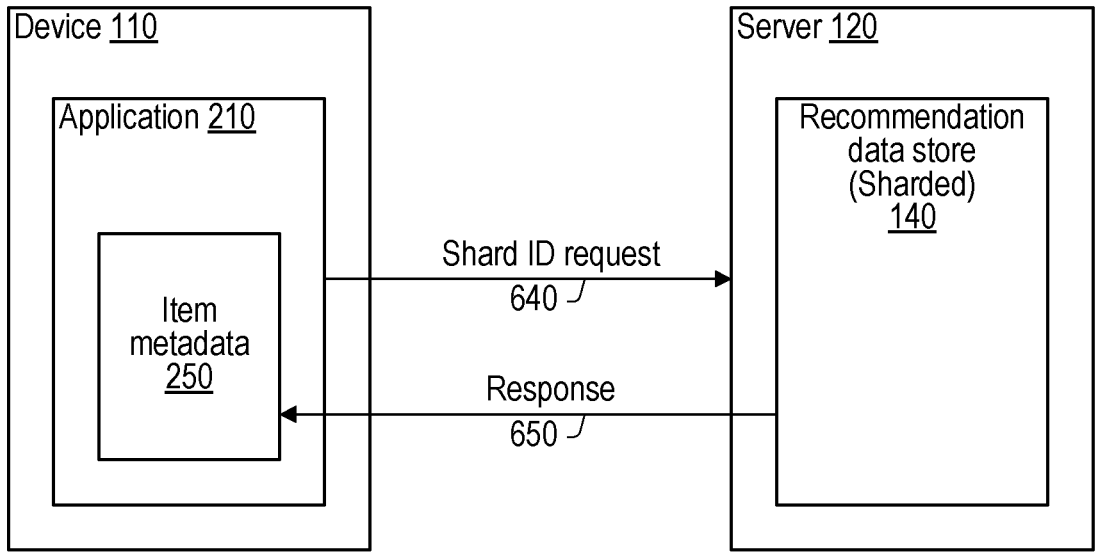
FIG. 6B is a block diagram of one embodiment of a shard ID retrieval.

In order to generate recommendations that are based on items in item metadata 250, device 110 needs to retrieve any associated shard IDs for each entry in metadata 250. An example embodiment of a shard ID retrieval is depicted with respect to FIG. 6B. In some cases, the shard ID for an item may also be stored in KV store 330 (not shown in FIG. 6B). Accordingly, in one embodiment, application 210 may generate a shard ID request 640 for each item in metadata 250 before generating any recommendation requests. A particular shard ID request might include a key used to index into KV store 330; and the corresponding shard ID response 650 would include, at a minimum, the shard ID, which can be stored in item metadata 250. Response 650 might also include an embedding located in KV store 330. Shard IDs might be requested all at once, or on an as-needed basis (e.g., via a KV request).

To increase security, shards of sharded embedding store 340S may be periodically rotated, such that items in embedding store 340S are now assigned to different shards. In some cases, server 120 may decide to reassign shard IDs of store 340S, while keeping the subset of items in each shard unchanged. For example, all items with a shard ID of 2 may have their shard ID rotated to 5. In case of rotation, device 110 may periodically (e.g., once a day at a specific hour) send a new shard ID request 640 to receive the updated shard IDs. Alternatively, server 120 may send new shard IDs to device 110 whenever shards are rotated or modified without receiving a request 640 from device 110. In other embodiments, items in embedding store 340S may be resharded such that the contents of a given partition change in addition to a mere change in shard ID.

Figure 6C:
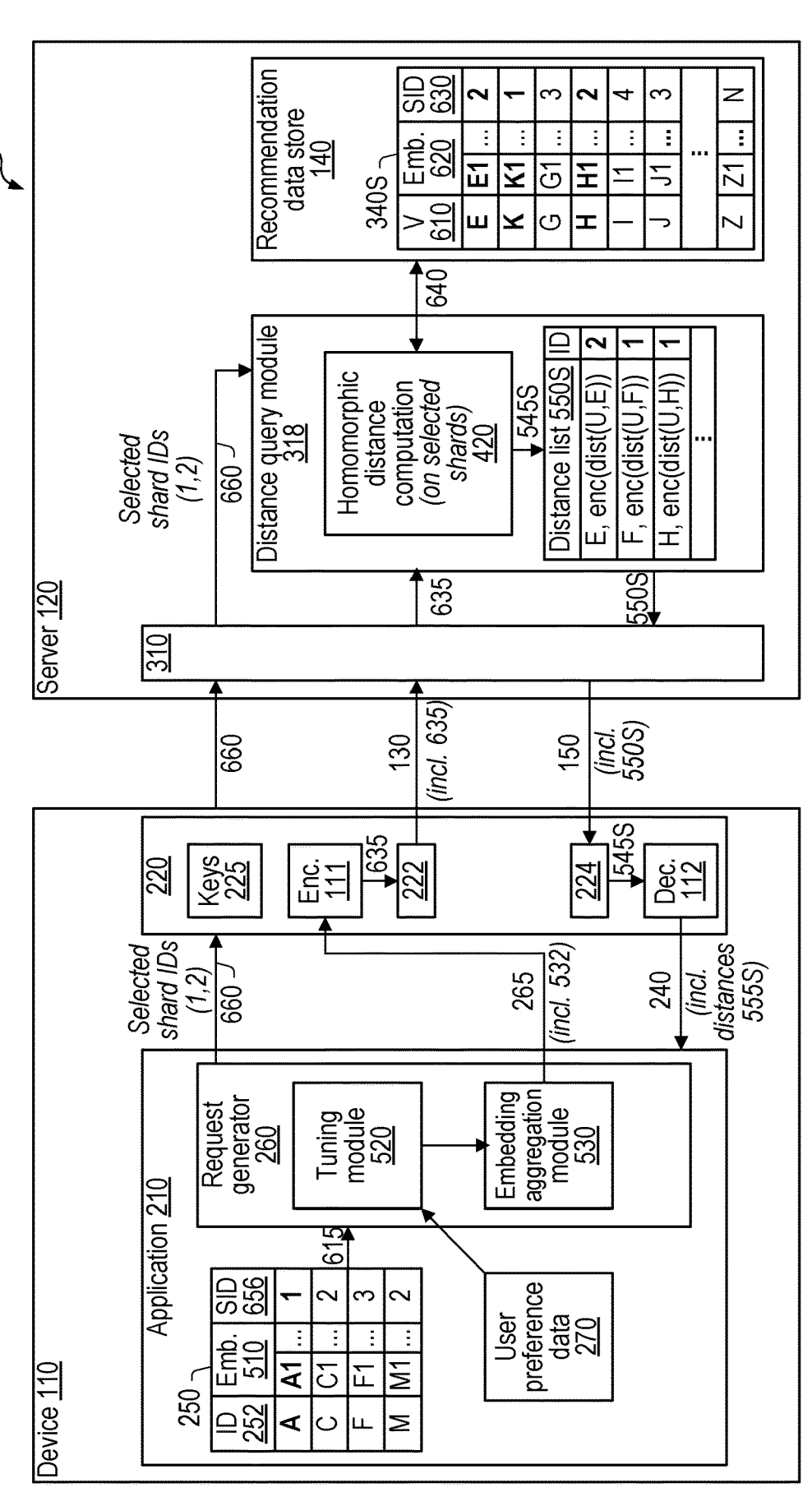
FIG. 6C is a block diagram of one embodiment of a distance query between a device and a sharded server.

FIG. 6C depicts an embodiment of a distance query with database sharding. As shown, system 100S depicts an exchange similar to that depicted in FIG. 5, but with the inclusion of sharding. As depicted, server 120 stores embeddings in sharded embedding store 340S, which includes a column for shard ID (SID) 630. Item metadata 250 also includes a column for SID 656. Privacy protocols can now also use selected shard IDs 660 as needed.

In the depicted embodiment, when an item is selected for a recommendation request 130 (e.g., A), its respective embedding 510 (A1) and shard ID 656 (1) are sent to request generator 260 as inputs 615. To help preserve privacy, request generator 260 may choose to include additional shard IDs along with shard ID 656 for selected item A. The additional shard IDs may be selected in any suitable manner. Shards may be selected randomly, based on each shard's embedding space region, based on qualitative similarity of shards, etc. Request generator 260 then routes these one or more shard IDs to control module 220 as shard IDs 660. Meanwhile, request generator 260 is executable to generate output embedding 532 from input embedding 510 within inputs 615 and to include output embedding 532 in request data 265, which is routed to encryption module 111 within control module 220. Encryption module 111 then produces encrypted embedding 635, which is included by routing module 222 in encrypted request 130. Control module 220 can thus send encrypted request 130 to server 120, along with selected shard IDs 660. Device 110 receives a response 150 containing a distance list 550S that includes distances between embedding 532 and elements of sharded embedding store 340S whose shard IDs 630 correspond to selected shard IDs 660. Distance list 550S is then relayed by routing module 224 and decrypted by decryption module 112 into decrypted distances 555S for use in recommendations.

Control module 310 at server 120 receives encrypted embedding 635 within encrypted request 130 and shard IDs 660 and forwards these values to distance query module 318. Homomorphic distance computation module 420 then performs ID request 640 with sharded embedding store 340S for embeddings associated with shard IDs 660. In this example, shards 1 and 2 are of interest; accordingly, module 420 performs distance computations on items E, K, and H, which are either associated with shard IDs 1 or 2. In doing so, module 420 compiles a distance list 550S between embedding 635 and each of the embeddings in store 340S that are associated with shards IDs 1 and 2. When all appropriate distances 545S are computed, server 120 returns distance list 550S to device 110 via control module 310.

Figure 6D:
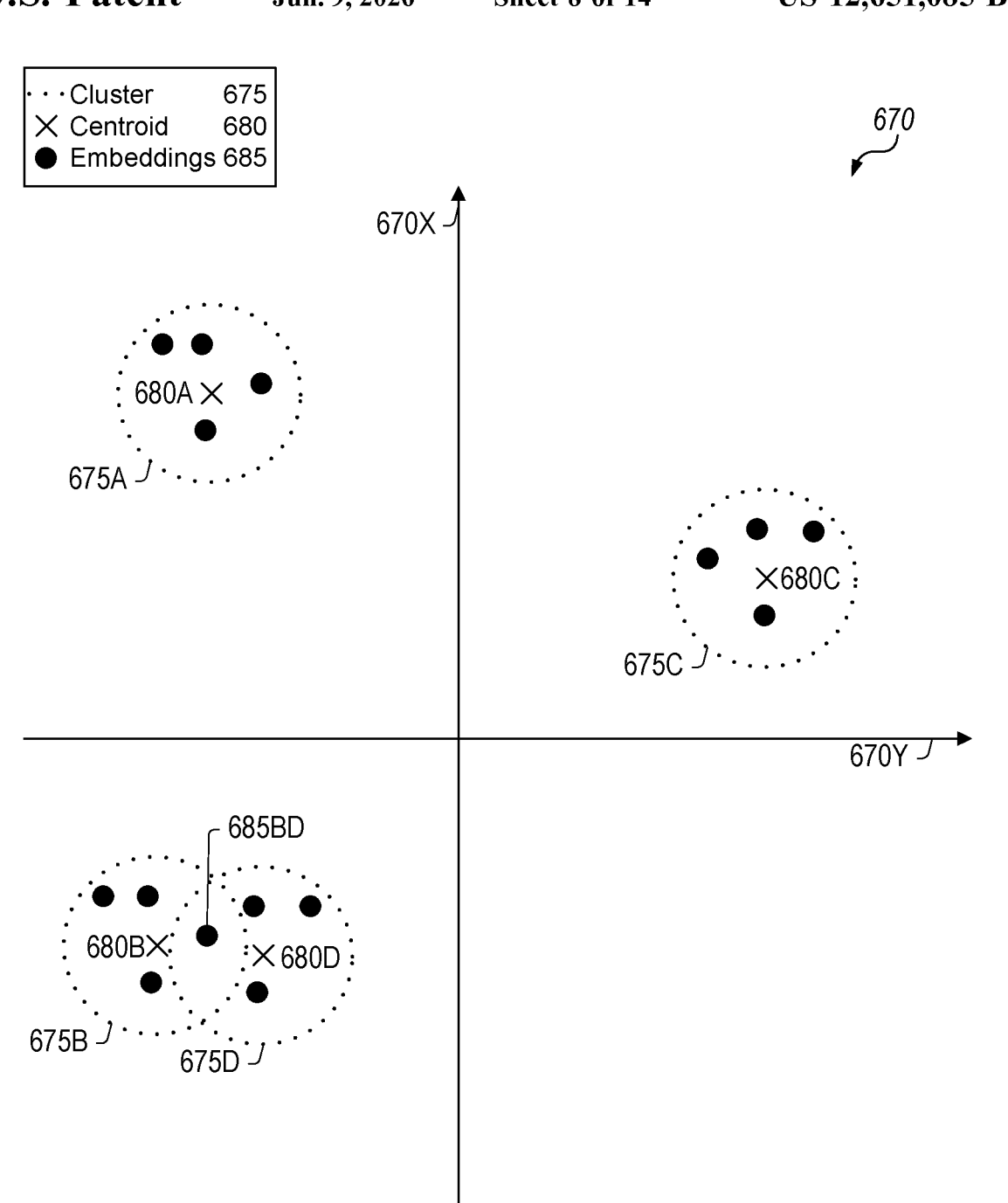
FIG. 6D is a block diagram of one embodiment of embedding clusters in an embedding space.

FIG. 6D depicts an embodiment of embedding clusters 675 in an embedding space 670. As shown, embeddings 685 (shown as dots) are distributed in clusters 675 (whose boundaries are in dotted lines) across a two-dimensional embedding space 670 of dimensions 670X and 670Y (naturally, the embedding space may have more dimensions than shown). Furthermore, each cluster 675 has a corresponding centroid 680 (each of which is shown as an 'X') representing a geometric aggregate of the embeddings 685 within that cluster. Furthermore, two or more clusters 675 may overlap (e.g., clusters 675B and 675D), and one or more embeddings may be in multiple clusters (e.g., embedding 685BD). In some embodiments, clusters 675, centroids 680, and embeddings 685 may be used in sharding one or more stores of data store 140, as will be discussed in more detail with respect to FIG. 7E.

A wide variety of possible techniques for performing privacy-preserving recommendations have been discussed with respect to FIGS. 1-6. This variety enables the use of different types of exchanges depending on factors such as the format of the requested recommendation information, the desired personalization level of the recommendation, etc. Specific examples of recommendations are now described with respect to FIGS. 7A-D. These examples include both single-stage and multi-stage recommendations. While these examples are all made in the context of books, the disclosed techniques are of course equally applicable to other item types, including movies, music, shopping items, and the like.

Figure 7A:
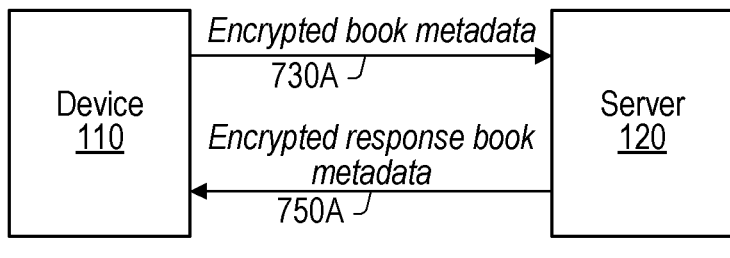
FIG. 7A is a block diagram of one embodiment of a single-stage key-value recommendation request.

FIG. 7A depicts an example of a single-stage encrypted KV operation 700A for specific book metadata. As shown, device 110 sends encrypted book metadata 730A that acts as the key to the key-value operation, and server 120 returns encrypted response book metadata 750A stored in recommendation data store 140. Suppose, for example, item metadata 250 stored on device 110 indicates that the user has purchased the following books: *The Shining* by Stephen King, *Middlemarch* by George Eliot, and *Gravity's Rainbow* by Thomas Pynchon. Device 110 might send a series of encrypted KV request operations to server 120 in order to retrieve other books by the same authors. Accordingly, a first encrypted KV request might retrieve *It* and Nov. 22, 1963; a second encrypted KV request might retrieve *Silas Marner, The Mill on the Floss*, and *Adam Bede*; and a third encrypted KV request might retrieve *Mason & Dixon* and *The Crying of Lot* 49. In this example, the data repository in recommendation data store would be set up to return books by a given author. Many other different types of data repositories are possible: current popular books in a given genre (young adult, cozy mystery, true crime, etc.), books released in a given year/season, etc. All of these requests may be made in a way that ensures the subject of the recommendations is not known to server 120.

Moreover, device 110, in some embodiments, can choose to generate its user recommendation by refining the information received from server 120 (e.g., the list of other books by King, Eliot, and Pynchon) with user preference data 270. Suppose user preference data 270 indicates that the user of device 110 has finished both *The Shining and Middlemarch*, but has only completed 30 pages of *Gravity's Rainbow* despite owning the book for over two years. Still further, suppose user preference data 270 also indicates that the user has read *Middlemarch* on three different occasions and has also made extensive highlights and annotations in that book. Based on this information (which has never been sent to server 120), device 110 might choose to present a user recommendation that includes *Silas Marner* and *Adam Bede* (based on a perceived strong preference for the works of Eliot) and Nov. 22, 1963 (based on having finished *The Shining*), but does not include any other titles from Pynchon (based on not having finished *Gravity's Rainbow*).

Figure 7B:
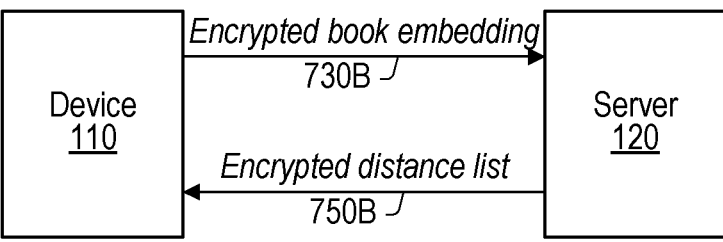
FIG. 7B is a block diagram of one embodiment of a single-stage distance query.

FIG. 7B depicts an example of a different type of single-stage operation 700B, in which a distance computation is performed within an embedding space. As shown, device 110 sends an encrypted book embedding 730B and receives from server 120 an encrypted distance list 750B that includes a list of distances from embedding 730B to other embeddings within an embedding space. Operation 700B can be performed at server 120 by distance module 318, for example.

In this example, it can be assumed that device 110 already includes embedding 730B. In one embodiment, when a book is stored on device 110, item metadata 250 may include an embedding for the book along with other metadata such as author, ISBN, year, genre, etc. Suppose device 110 stores an embedding for the book *Dracula*. This embedding can be sent as encrypted book embedding 730B to server 120. This embedding can represent a variety of different criteria in different embodiments. In one implementation, embedding 730B might reflect an embedding of a number of dimensions including genre, such that distance list 750B might include a list of other Victorian-era horror novels (e.g., *Frankenstein, The Turn of the Screw*), along with respective distances to the *Dracula* embedding. Furthermore, device 110 might choose to rank books in distance list 750B based on user preference data 270.

Figure 7C:
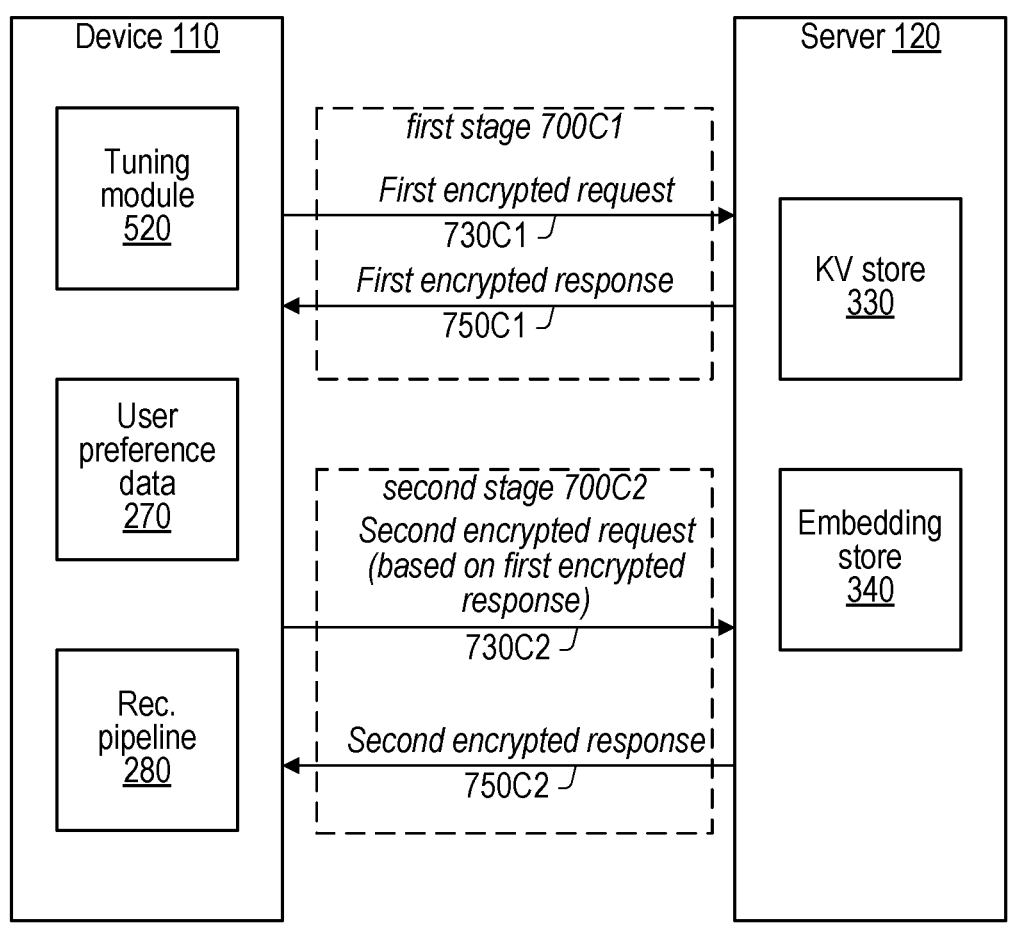
FIG. 7C is a block diagram of one embodiment of a two-stage recommendation request.
Figure 7D:
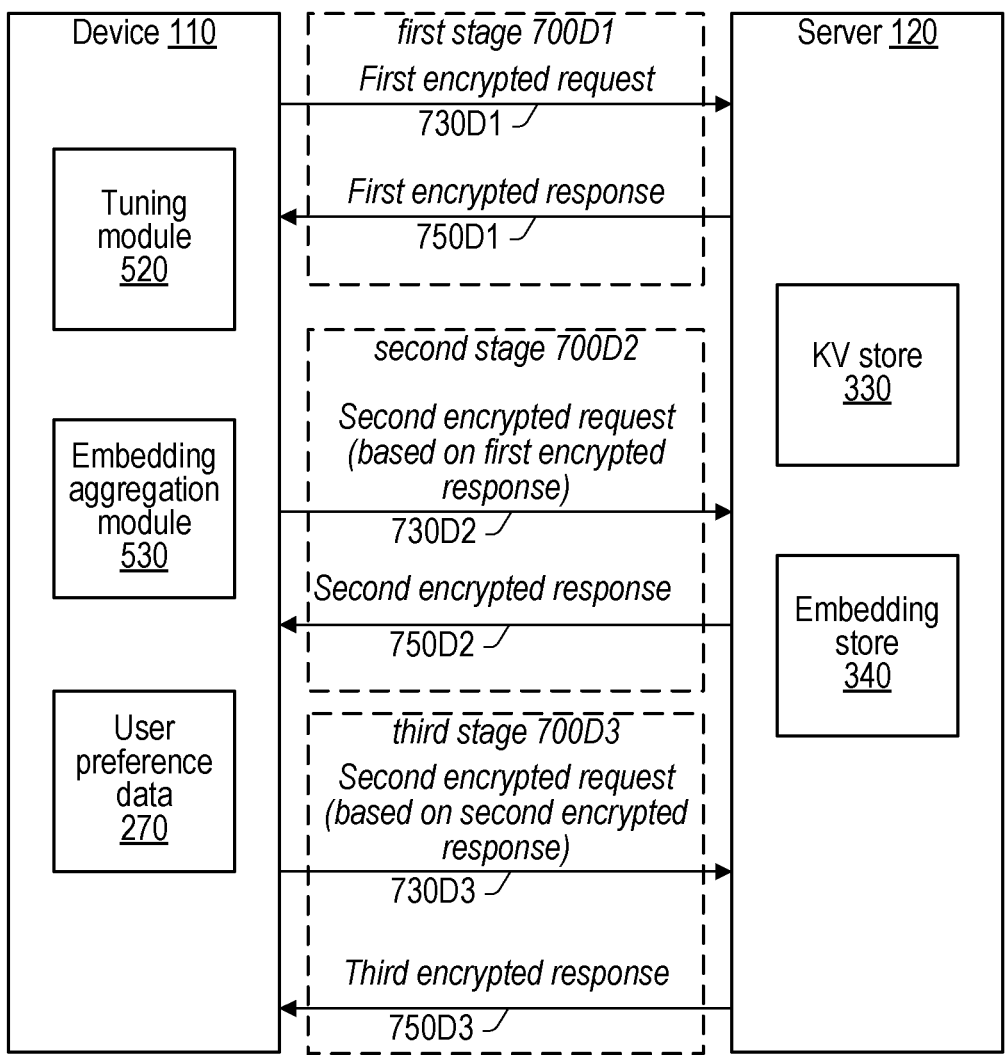
FIG. 7D-E are block diagrams of embodiments of three-stage recommendation requests.

FIGS. 7A-B were used to illustrate single-stage requests for information in key-value and embedding stores, respectively. Device 110 can also communicate with server 120 to make multi-stage requests in order to generate user recommendations. Generally speaking, device 110 can communicate with server 120 to obtain an encrypted response in a first stage, and then communicate with server 120 to make an encrypted request in a second, subsequent stage, where the encrypted request is based in some part on the content of the encrypted response from the first stage. This paradigm is illustrated generally in FIG. 7C. In first stage 700C1, device 110 sends first encrypted request 730C1 to server 120 and receives first encrypted response 750C1 in return. Device 110 then generates a second encrypted request 730C2 that is based in some part on the information in response 750C1. Device 110 receives second encrypted response 750C2 in return. This approach may be extended to any suitable number of stages. FIG. 7C illustrates a two-stage request, while FIG. 7D illustrates a three-stage request.

Accordingly, two-stage operation 700C can include different variations of key-value and embedding lookups in various implementations. As has been explained, types of data repositories within recommendation data store 140 other than KV stores and embedding stores are also possible. As such, a given stage of a multi-stage recommendation request according to the present disclosure can include a request for any data repository type supported by server 120.

In one embodiment, the first stage of operation 700C is a KV lookup, while the second stage is a distance computation in an embedding space. Thus, first stage 700C1 may include device 110 sending encrypted book metadata in 730C1 to server 120. As an example, encrypted book metadata in request 730C1 might describe a book such as *Dracula* and encrypted response 750C1 might be an embedding value that is stored in KV store 330 (e.g., a genre embedding for *Dracula*). Response 750C1 can then be decrypted by device 110. In second stage 700C2, device 110 may determine that it would be desirable to obtain a set of other embeddings similar to the just-received *Dracula* embedding. Accordingly, this embedding can be re-encrypted and included as part of second encrypted request 730C2. This request would be routed to encrypted distance query module 318, for example, in order to determine a set of embeddings that are close to the *Dracula* book embedding in the genre embedding space. The corresponding distance list included in 750C2 may thus identify other similar Victorian-era horror novels. Note that in this example, two types of privacy protocols are used: first stage 700C1 uses a PIR protocol that includes performing a KV search using KV store 330, while the second stage 700C2 uses a privacy protocol that involves performing a NNS operation using embedding store 340. Thus, this disclosure contemplates that a given query may involve different types of subsidiary privacy protocols.

Alternative two-stage embodiments exist. For example, stages 700C1 and 700C2 may both include KV retrieval operations. Thus, a first stage 700C1 may include device 110 sending a first encrypted request 730C1 with encrypted metadata (e.g., an ISBN for *Dracula*) and receiving a first encrypted response 750C1 with more encrypted metadata relating to request 730C1 (e.g., "1897" [year of publication], horror [genre], Bram Stoker [author]). Then, a second stage 700C2 may include device 110 sending encrypted request(s) 730C2 based on response 750C1. For example, second stage 700C2 may include requests to find other book with metadata similar to that retrieved for *Dracula*. For example, a first request could be for books published in 1897; a second request could be for books in the horror genre; and a third request could be for other books by Bram Stoker. Device 110 may accordingly receive a second encrypted response 750C2 that includes metadata for items that are described by the metadata of request 730C2. For example, response 750C2 may contain ISBNs of all books that have any of the following properties described by request 730C2 (and by extension response 750C1): books written by Bram Stoker, horror books, and books published in 1897. The respective response 750C2 may then be decrypted by device 110 and used by recommendation pipeline 280 to provide recommendations that give users a number of other items that share various properties with the initial item of first encrypted request 730C1 (e.g., a "books like *Dracula*" recommendation). Using KV stages as described may be contemplated when an item-based recommendation is desired over a user-based recommendation (e.g., "books like *Dracula*," as opposed to "books you may enjoy because you enjoyed *Dracula*"), or where device 110 was recently purchased and thus has no user preference data 270. Furthermore, two-stage embodiments may be used with any possible combination of request types (e.g., both stages include embedding operations), including request types not shown (e.g., one-hot types).

User preference data 270 may be used by device 110 in different ways before, during, or after any of the stages depicted. For example, tuning module 520 may be executable to tune, between first and second stages 700C1 and 700C2, received embeddings of response 750C1 based on user preference data 270 (e.g., user interaction with the item(s) of response 750C1). As another example, first stage 700C1 might retrieve information about multiple items from response 750C1; and use user preference data 270 to select which of these items is the subject of second stage 700C2. Furthermore, device 110 may, after second stage 700C2, use recommendation pipeline 280 to rank items from the encrypted list of response 750C2 based on user preference data 270. For example, recommendation pipeline 280 might take items ranked by decrypted distances included in response 750C2 and output a recommendation with a different ranking based on user preference data 270.

FIG. 7D depicts an example of a three-stage lookup 700D. At a first (KV) stage 700D1, device 110 sends a first request 730D1 with encrypted book metadata (e.g., multiple ISBNs) and receives from server 120 a corresponding first response 750D1 containing encrypted book embeddings. Then, embeddings from 750D1 are tuned (e.g., by tuning module 520 according to user preference data 270 and/or by embedding aggregation module 530) to output a second request 730D2 based on first response 750D1. At the second stage 700D2, device 110 sends a second request 730D2 with encrypted user preference embedding to server 120 and receives an encrypted response 750D2 with a distance list containing ISBNs of "neighboring" books whose embeddings are similar to the encrypted user preference embedding of second request 730D2. Then, at a third (KV) stage 700D3, device 110 sends encrypted third request 730D3 based on second response 750D2, which includes sending "neighboring" book metadata for all books (e.g., ISBNs) to server 120. Device 110 then receives a third encrypted response 750D3 that includes metadata describing those "neighbors." Metadata 750D3 may be used to gather other elements related to the recommendation (e.g., book cover images, author biographies, etc.) Thus, device 110 may provide an individualized recommendation that is based on the embeddings of 750D1, ranked based on the list of 750D2, and populated based on the metadata of 750D3.

Multiple permutations of stage request types may be implemented in the 3-stage lookup shown in FIG. 7D, in a manner similar to FIG. 7C.

Figure 7E:
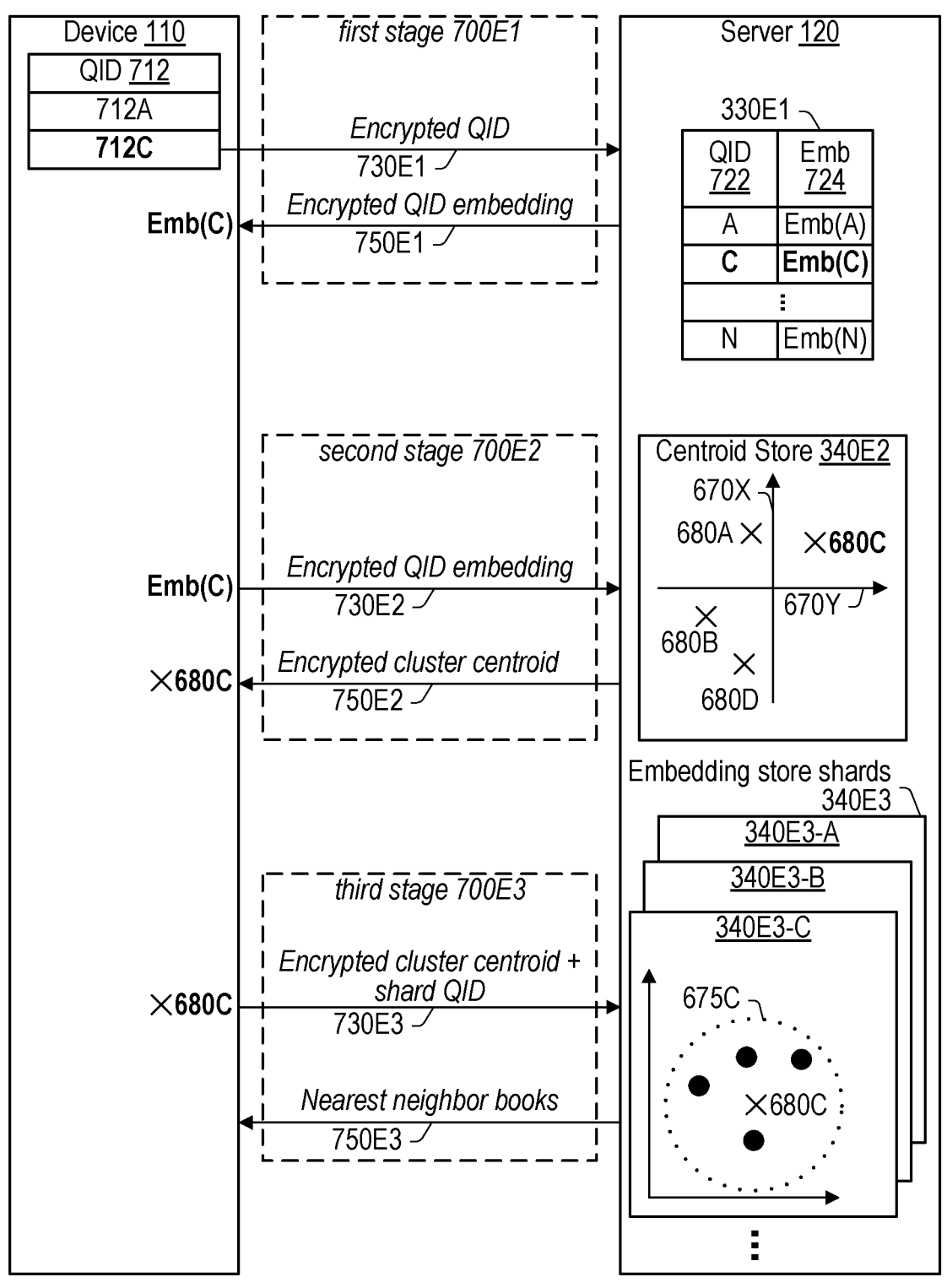

For example, FIG. 7E depicts a server 120 that includes KV store 330E1, centroid store 340E2, and embedding store shards 340E3 (shards 340E3A-C are shown). KV store 330E1 includes, at each entry for each cluster 675, a QID 722 as the entry's key and the respective QID embedding 724 as the entry's value. Centroid store 342E2 includes centroids 680A-N for respective clusters (of which only centroids 680A-D are shown). Server 120 is also configured to store, for each cluster 675, a separate embedding store shard that includes the centroid 680 and embeddings 685 of that cluster. For example, shard 340E3-C (corresponding to cluster 675C) includes all elements of cluster 675C (e.g., centroid 680C and embeddings 685C). Before sending a request for a nearest neighbor search (corresponding to a given QID), device 110 needs to know which one of shards 340E3 the request should be sent to and may thus receive one or more QIDs 722 and store them as QIDs 712. In the example shown in FIG. 7E, each cluster 675 includes books of a given user interest topic (e.g., romance, classics), and each centroid 680 is a centroid of the book embeddings 685 in their respective cluster 675.

Example lookup 700E shown in FIG. 7E is for a recommendation request of books of a particular topic with QID 712C. In first stage 700E1, device 110 sends encrypted QID 730E1 (QID 712C, shown in bold) to server 120 as a key to a KV store 330E1. Server 120 returns the value of the corresponding QID embedding 750E1 (Emb(C)). In a second stage 700E2, device 110 sends the encrypted QID embedding 730E2 (included in 750E1) as part of a distance query. In response, device 110 receives from server 120 via centroid store 340E2, the nearest-neighbor book cluster centroid (centroid 680C, which is returned as 750E2). In a third stage 700E3, device 110 sends encrypted centroid embedding 730E3 (obtained from 750E2) and plaintext QID 712C as part of another distance query to server 120. Server 120 first selects embedding store shard 350E3-C using QID 712C. Then, server 120 retrieves encrypted nearest-neighbor books 750E3 (e.g., encrypted ISBNs corresponding to embeddings 685C) using the selected shard.

Figure 8A:
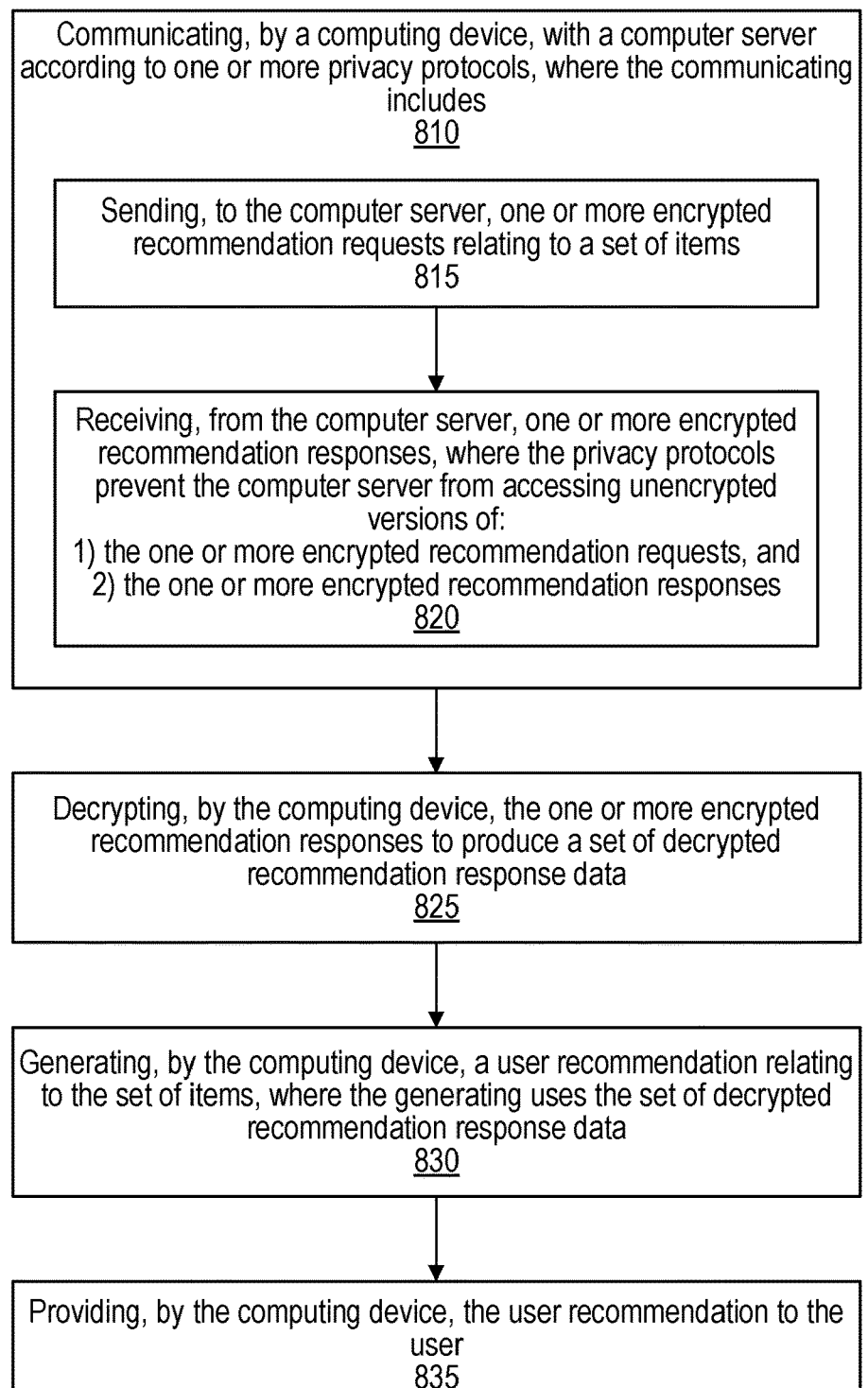
FIG. 8A is a flow diagram of one embodiment of a method performed by a computing device for providing user recommendations.

FIG. 8A is a flow diagram of one embodiment of a method 800A performed by a computing device (e.g., device 110) configured to communicate with a server to provide user recommendations.

Method 800A commences in 810, in which the computing device communicates with a computer server (e.g., server 120) according to one or more privacy protocols (e.g., privacy protocols 115). The privacy protocols may include a Private Information Retrieval protocol in one embodiment. The computing device will commonly be a mobile computing device such as a cellular phone, tablet, or laptop that is used by the user to e.g., consume media (but is not so limited).

The computer server with which the computing device is communicating may store, in a recommendation data store, different types of data relevant to generating user recommendations. For example, the computer server may include a key-value store. In some embodiments, the computer server stores embedding data that specifies respective embedding values for items within an embedding space.

In step 815 (which can be considered part of step 810), the computing device sends, to the computer server, one or more encrypted recommendation requests (e.g., encrypted recommendation request 130) relating to a set of items. The set of items may be a set of media content, and the computer server may accordingly include a recommendation data store that includes metadata relating to a library of the set of media content.

Method 800A continues in step 820 (which can also be considered part of step 810), in which the computing device receives one or more encrypted recommendation responses (e.g., encrypted recommendation response 150), where the privacy protocols prevent the computer server from accessing unencrypted versions of the encrypted recommendation requests and the encrypted recommendation responses. In some embodiments, the encrypted recommendation responses are generated using a recommendation data store accessible by the computer server that stores information about the set of items.

The communicating is not limited to sending a single encrypted recommendation request to the server and receiving a single encrypted recommendation response from the server. For example, the communicating may include a first stage in which the device sends a first encrypted recommendation request that specifies a particular item, and then receive a first encrypted recommendation response that includes a first set of embedding values for the particular item. In a second stage, the computing device may send a second recommendation request that includes at least one embedding value based on the first set of embedding values, and then receive a second encrypted recommendation response that includes a second set of embedding values that are determined to be close to the at least one embedding value in an embedding space. As noted, multiple privacy-preserving protocols may be combined as part of a larger operation. In some cases, a first stage may be performed using a protocol that includes a privacy-preserving key-value retrieval operation, and a second stage may be performed using a privacy protocol that includes a privacy-preserving nearest neighbor search operation. In those implementations, the communicating may further include generating the embedding value by tuning the one or more of the first set of embedding values using the user preference data.

In some embodiments, the computing device may store user preference data collected based on activity on the computing device relative to the set of items and use that user preference information to modify one or more of the encrypted recommendation requests. Additionally, the user preference data may include volume information relating to the set of items, where the volume information specifies one or more of the following: a number of times particular media content items have been consumed by the user, an amount of time the user has spent interacting with various ones of the media content items, a percentage of particular media content items consumed on the computing device, explicit user preference information relating to the media content items. The user preference data may relate to a type of media content, and accordingly include information collected by one or more applications (e.g., media content applications) executing on the computing device.

The communicating may include additional requests and/or responses. For example, the communication may further include the device sending a third encrypted recommendation request that includes at least one tuned embedding value based on the second set of embedding values and tuned using the user preference data. The device may then receive a third encrypted recommendation responses that includes a third set of embedding values that are determined to be close to the at least one tuned embedding value in the embedding space.

Method 800A continues in step 825, in which the computing device decrypts (e.g., using decryption module 112) the one or more encrypted recommendation responses to produce a set of decrypted recommendation response data.

In 830, the computing device generates a user recommendation (e.g., user recommendation 170) relating to the set of items, where the generating uses the set of decrypted recommendation response data. In some embodiments, the user recommendation is produced using a subset of user preference data, without sending the subset of the user preference data to the computer server. The generating may further include selecting items to include in the user recommendation based on user preference data stored on the computing device, where the user preference data is collected based on activity of the user on the computing device relative to the items. Additionally, the generating may include ranking the items based on user preference data stored on the computing device that is collected based on activity of the user on the computing device relative to the items. Alternatively, the ranking may be done using ranking information included in the set of decrypted recommendation response data.

In 835, the computing device provides the user recommendation to the user. The user recommendation may, in some embodiments, relate to one or more of the following types of media content: books, music, video content, social media content. Furthermore, the set of items may be a set of tangible goods, and the user recommendation may be a recommendation to purchase one or more of the sets of tangible goods.

As discussed above, the computing device and computer server may implement sharding and communicate accordingly. For example, the computer device may receive, as part of a first encrypted recommendation response, a set of shard identifiers for a recommendation data store on the computer server, where the set of shard identifiers specifies a particular shard identifier that corresponds to the first set of one or more embedding values. Then, the computer device may send, as part of the second encrypted recommendation request, a group of shard identifiers that includes the particular shard identifier and one or more of the other shard identifiers. The group of shard identifiers may define a portion of the recommendation data store that is queried to produce the second encrypted recommendation response.

Method 800A and the described variations can be implemented by program instructions stored on a non-transitory computer-readable storage medium that are capable of being executed by the computing device. Note that in some cases, program instructions may be stored on a storage medium but not enabled to execute in a particular computing environment. Program instructions stored on a computer-readable medium can be said to "executable" to perform certain functionality, whether or not current software configuration parameters permit such execution. Similarly, a computing device that is configured to implement method 800A and the described variations is also contemplated.

Figure 8B:
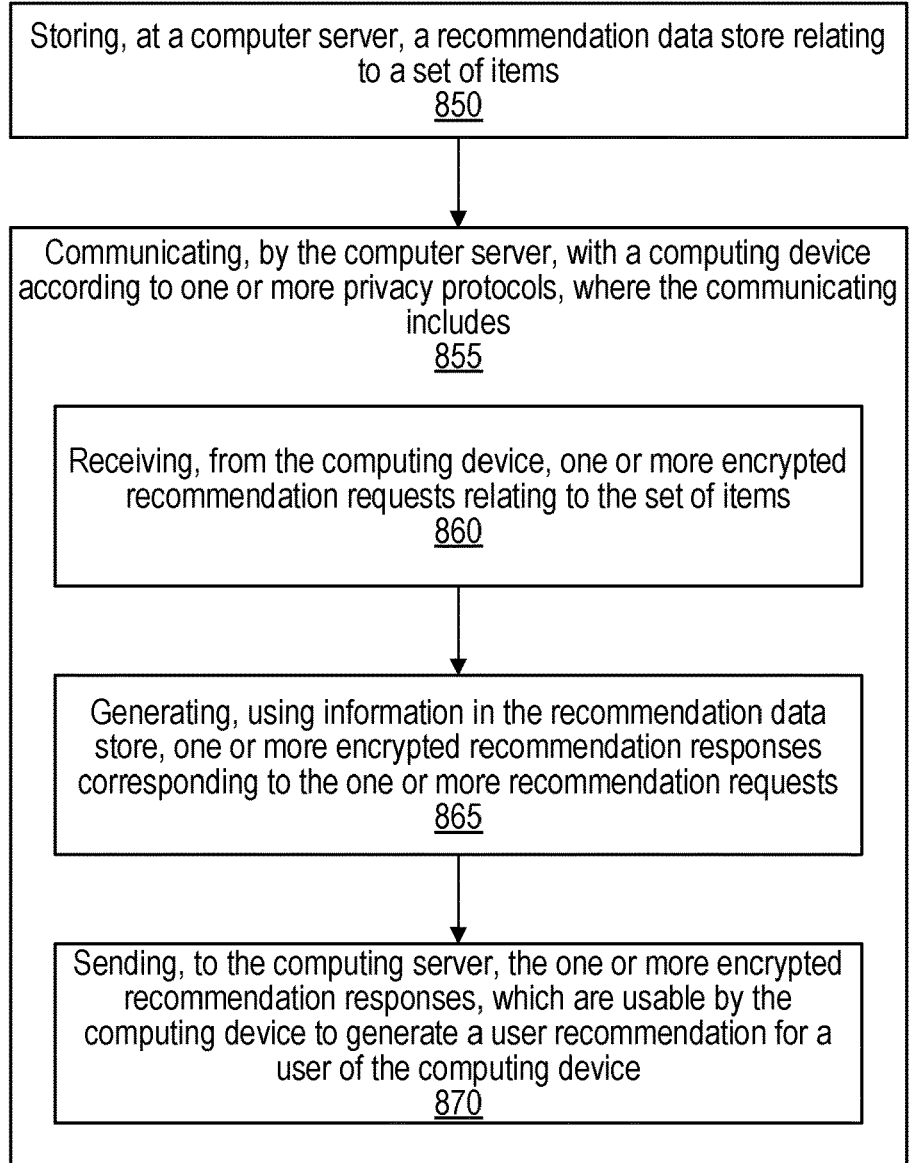
FIG. 8B is a flow diagram of one embodiment of a method performed by a computer server for servicing recommendation requests.

FIG. 8A is a flow diagram of a method 800A performed by a computing device requesting recommendation information from a server. For example, method 800A may be performed by a mobile computing device such as a smart phone. FIG. 8B, on the other hand, describes a method 800B that is performed by a server (e.g., server 120) to generate a recommendation response in response to a recommendation request from a computing device (e.g., computing device 110).

Method 800B commences in 850, in which the computer server stores a recommendation data store (e.g., recommendation data store 140) relating to a set of items. A "recommendation data store" is any set of data repositories (e.g., databases, etc.) that includes recommendation data usable for generating user recommendations. The recommendation data store may include different types of stores such as a key-value store and/or an embedding store that includes a set of embedding values for the set of items.

Method 800B continues in 855, in which the computer server communicates with a computing device according to one or more privacy protocols (e.g., privacy protocols 115 such as PIR). The phrase "communicates" is intended to be broad enough to cover computer server receiving and sending information to device 110.

In 860 (which can be considered part of step 855), the computer server receives, from the computing device, one or more encrypted recommendation requests (e.g., encrypted recommendation request 130) relating to the set of items.

Method 800B continues in step 865 (which can also be considered part of step 855), in which the computer server generates, using information in the recommendation data store, one or more encrypted recommendation responses (e.g., encrypted recommendation response 150) corresponding to the one or more recommendation requests.

In step 870 (which can be considered part of step 855), the computer server sends, to the computing device, the one or more encrypted recommendation responses, which are usable by the computing device to generate a user recommendation for a user of the computing device.

The computer server may return different types of recommendations. For example, the set of items may be a set of media content items or a set of tangible goods or services. In that case, the user recommendation may specify one or more items to the user based on information in the recommendation data store and user preference data stored at the computing device.

In some implementations, the server performs a single-stage key-value retrieval operation. The one or more encrypted recommendation requests may include a single encrypted recommendation request and the one or more encrypted recommendation responses may include a single encrypted recommendation response. In that implementation, the single encrypted recommendation request includes a key for key-value retrieval, and the single encrypted recommendation response includes data in the key-value store that corresponds to the key.

As another possibility, there may be multiple stages of encrypted recommendation requests and responses. In some embodiments, the communicating with the device includes a first stage where the server receives a first of the one or more encrypted recommendation requests that specifies a particular item of the set of items, and then sends a first of the one or more encrypted recommendation responses that includes a first set of one or more embedding values for the particular item. At a second stage, the server may receive a second of the one or more encrypted recommendation requests that includes at least one embedding value based on the first set of one or more embedding values. The server may then send a second of the one or more encrypted recommendation responses that includes a second set of one or more embedding values. The second set of embedding values may be determined to be close to at least one embedding value within an embedding space defined by the set of embedding values for the set of items included within the embedding store. This determination may be done using a nearest neighbor search performed using a homomorphic cosine similarity formula.

In some embodiments, the server may shard the recommendation store, where the recommendation data store is divided into multiple shards having respective shard identifiers. Accordingly, the server may send shard identifiers to the computing device prior to one or more recommendation requests. In that case, the particular one of the one or more encrypted recommendation requests may include an encrypted embedding of a particular item, and where the communicating further includes receiving, by the computer server, a plaintext shard identifier for a particular shard that includes an embedding for the particular item. The server may then perform, within the particular shard, a nearest neighbor search relative to the embedding for the particular item. Additional shard identifiers may be sent to preserve user privacy. For example, the communicating may further include, in addition to the plaintext shard identifier, one or more other plaintext shard identifiers for other shards that do not correspond to the embedding for the particular item.

Method 800B and the described variations can be implemented by program instructions stored on a non-transitory computer-readable storage medium that are capable of being executed by a computer server. Note that in some cases, program instructions may be stored on a storage medium but not enabled to execute in a particular computing environment. Note that program instructions stored on a computer-readable medium can be said to "executable" to perform certain functionality, whether or not current software configuration parameters permit such execution. Executability means that when and if the instructions are executed, they perform the functionality in question. Similarly, a computing device that is configured to implement method 800B and the described variations is also contemplated.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript. An instance of a program being executed may be referred to as a "process."

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various software operations that are performed in the context of any computing device that uses an operating system to run and schedule processes. Such a computing device can be configured according to any known configuration of computer hardware. A typical hardware configuration includes a processor subsystem, memory, and one or more I/O devices coupled via an interconnect. A given computing device may also be implemented as two or more computer systems operating together.

The processor subsystem of the computing device may include one or more processors or processing units. In some embodiments of the computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the computing device is usable to store program instructions executable by the processor subsystem to cause the computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the computing device is not limited to primary storage. Rather, the computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

What is claimed is:

1. An apparatus, comprising:
a processor circuit; and
a memory storing instructions executable by the processor circuit to cause the apparatus to perform operations comprising:
   storing user preference data collected based on activity on the apparatus relative to a set of items;
   communicating with a computer server according to one or more privacy protocols, wherein the communicating includes:
      sending, to the computer server, one or more encrypted recommendation requests relating to the set of items; and
      receiving, from the computer server, one or more encrypted recommendation responses, wherein the one or more privacy protocols prevent the computer server from accessing unencrypted versions of 1) the one or more encrypted recommendation requests and 2) the one or more encrypted recommendation responses;
   decrypting, by the apparatus, the one or more encrypted recommendation responses to produce a set of decrypted recommendation response data;
   generating a user recommendation relating to the set of items, wherein the generating uses the set of decrypted recommendation response data, wherein the user recommendation is produced by the apparatus using a subset of the user preference data, but without sending the subset of the user preference data to the computer server; and
   providing the user recommendation to the user.

2. The apparatus of claim 1, wherein:
the user preference data includes information collected by one or more applications executing on the apparatus; and
the one or more applications include media content applications.

3. The apparatus of claim 1, wherein the operations further comprise:
using user preference data to modify one or more of the encrypted recommendation requests; and/or
using the user preference data to generate the user recommendation by ranking information included in the set of decrypted recommendation response data.

4. The apparatus of claim 1, wherein the one or more encrypted recommendation requests include a single encrypted recommendation request, and wherein the one or more recommendation responses include a single encrypted recommendation response; and
wherein the single encrypted recommendation request includes a key for key-value retrieval, and wherein the single recommendation response includes data that corresponds to the key.

5. The apparatus of claim 1, wherein the communicating further includes:
sending, to the computer server, a first of the one or more encrypted recommendation requests that specifies a particular item of the set of items;
receiving, from the computer server, a first of the one or more recommendation responses that includes a first set of one or more embedding values for the particular item;
sending, to the computer server, a second of the one or more encrypted recommendation requests that includes at least one embedding value based on the first set of one or more embedding values; and
receiving, from the computer server, a second of the one or more encrypted recommendation responses that includes a second set of one or more embedding values that are determined to be close to the at least one embedding value in an embedding space.

6. The apparatus of claim 5, wherein the communicating further includes:
sending, to the computer server, a third of the one or more encrypted recommendation requests that includes at least one tuned embedding value based on the second set of one or more embedding values and tuned using user preference data; and
receiving, from the computer server, a third of the one or more encrypted recommendation responses that includes a third set of one or more embedding values that are determined to be close to the at least one tuned embedding value in the embedding space.

7. The apparatus of claim 5, wherein the communicating further includes:

receiving, as part of the first encrypted recommendation response, a set of shard identifiers for a recommendation data store on the computer server, the set of shard identifiers specifying a particular shard identifier corresponding to the first set of one or more embedding values; and sending, as part of the second encrypted recommendation request, a group of shard identifiers that includes the particular shard identifier and one or more other ones of the set of shard identifiers, the group of shard identifiers limiting a portion of the recommendation data store that is queried to produce a second encrypted recommendation response corresponding to the second encrypted recommendation request.

8. The apparatus of claim 1, wherein a first one of the one or more encrypted recommendation requests includes a particular embedding value for a particular one of the set of items, and wherein a corresponding first one of the one or more recommendation responses identifies a plurality of items in the set of items having embedding values similar to the particular embedding value.

9. The apparatus of claim 8, wherein the communicating further includes generating the particular embedding value by tuning the one or more of a first set of embedding values using user preference data collected based on activity on the apparatus relative to the set of items.

10. A non-transitory computer-readable medium having program instructions stored therein that are executable by a computing device to perform operations comprising:

storing user preference data collected based on activity on the computing device relative to a set of items;

communicating with a computer server according to one or more privacy protocols, wherein the communicating includes:

sending, to the computer server, one or more encrypted recommendation requests relating to the set of items; and receiving, from the computer server, one or more encrypted recommendation responses, wherein the one or more privacy protocols prevent the computer server from accessing unencrypted versions of 1) the one or more encrypted recommendation requests and 2) the one or more encrypted recommendation responses;

decrypting the one or more encrypted recommendation responses to produce a set of decrypted recommendation response data;

generating a user recommendation relating to the set of items, wherein the generating uses the set of decrypted recommendation response data, wherein the user recommendation is produced by the computing device using a subset of the user preference data, but without sending the subset of the user preference data to the computer server; and providing the user recommendation to the user.

11. The computer-readable medium of claim 10, wherein:
the user preference data relates to a type of media content;
the user preference data specifies volume information relating to the set of items; and
the volume information specifies one or more of the following: a number of times particular media content items have been consumed by the user, an amount of time the user has spent interacting with various ones of the media content items, a percentage of particular media content items consumed on the computing device, explicit user preference information relating to the media content items.

12. The computer-readable medium of claim 10, wherein the one or more encrypted recommendation requests include a single encrypted recommendation request, and wherein the one or more encrypted recommendation responses include a single encrypted recommendation response; and wherein the single encrypted recommendation request includes a key for key-value retrieval, and wherein the single encrypted recommendation response includes data that corresponds to the key.

13. The computer-readable medium of claim 10, wherein the communicating further includes:

sending, to the computer server, a first of the one or more encrypted recommendation requests that specifies a particular item of the set of items;

receiving, from the computer server, a first of the one or more encrypted recommendation responses that includes a first set of one or more embedding values for the particular item;

sending, to the computer server, a second of the one or more encrypted recommendation requests that includes at least one embedding value based on the first set of one or more embedding values; and receiving, from the computer server, a second of the one or more encrypted recommendation responses that includes a second set of one or more embedding values that are determined to be close to the at least one embedding value in an embedding space.

14. A method, comprising:
storing, by a computing device, user preference data collected based on activity on the computing device relative to a set of items;

communicating, by the computing device, with a computer server according to one or more privacy protocols, wherein the communicating includes:

sending, to the computer server, one or more encrypted recommendation requests relating to the set of items; and receiving, from the computer server, one or more encrypted recommendation responses, wherein the one or more privacy protocols prevent the computer server from accessing unencrypted versions of 1) the one or more encrypted recommendation requests and 2) the one or more encrypted recommendation responses;

decrypting, by the computing device, the one or more encrypted recommendation responses to produce a set of decrypted recommendation response data;

generating, by the computing device, a user recommendation relating to the set of items, wherein the generating uses the set of decrypted recommendation response data, wherein the user recommendation is produced by the computing device using a subset of the user preference data, but without sending the subset of the user preference data to the computer server; and providing, by the computing device, the user recommendation to the user.

15. The method of claim 14, further comprising:
sending, to the computer server using a first one of the one or more privacy protocols, a first of the one or more encrypted recommendation requests that specifies a particular item of the set of items;

receiving, from the computer server using the first privacy protocol, a first of the one or more recommendation responses that includes a first set of one or more embedding values for the particular item;

sending, to the computer server using a second one of the one or more privacy protocols, a second of the one or more encrypted recommendation requests that includes at least one embedding value based on the first set of one or more embedding values; and receiving, from the computer server using the second privacy protocol, a second of the one or more encrypted recommendation responses that includes a second set of one or more embedding values that are determined to be close to the at least one embedding value in an embedding space.

16. The method of claim 15, wherein the first privacy protocol includes a key-value retrieval operation, and the second, different privacy protocol includes a privacy-preserving nearest neighbor search operation.

17. The method of claim 14, wherein the computing device is a mobile device and wherein at least one of the one or more encrypted recommendation responses is generated using a recommendation data store accessible by the computer server that stores information about the set of items.

\* \* \* \* \*